US012337597B2

(12) United States Patent
Shinkawa

(10) Patent No.: US 12,337,597 B2
(45) Date of Patent: Jun. 24, 2025

(54) LIQUID EJECTING APPARATUS AND HEAD UNIT FOR DETERMINING PRESENCE OF FOREIGN MATTER

(71) Applicant: SEIKO EPSON CORPORATION, Tokyo (JP)

(72) Inventor: Osamu Shinkawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 221 days.

(21) Appl. No.: 18/188,509

(22) Filed: Mar. 23, 2023

(65) Prior Publication Data

US 2023/0302792 A1 Sep. 28, 2023

(30) Foreign Application Priority Data

Mar. 25, 2022 (JP) ................................ 2022-049443

(51) Int. Cl.
*B41J 2/045* (2006.01)
*B41J 2/14* (2006.01)

(52) U.S. Cl.
CPC ......... *B41J 2/04581* (2013.01); *B41J 2/0451* (2013.01); *B41J 2/14233* (2013.01); *B41J 2002/14266* (2013.01)

(58) Field of Classification Search
CPC .. B41J 2/04581; B41J 2/0451; B41J 2/14233; B41J 2002/14266; B41J 2002/14354; B41J 2/04541; B41J 2/04588; B41J 2/04596; B41J 2/16579; B41J 2/14201
See application file for complete search history.

(56) References Cited

U.S. PATENT DOCUMENTS

2015/0077463 A1 3/2015 Hosokawa
2019/0263113 A1* 8/2019 Shinkawa ............ B41J 2/04541

FOREIGN PATENT DOCUMENTS

JP 2015-058540 A 3/2015

* cited by examiner

*Primary Examiner* — Jannelle M Lebron

(74) *Attorney, Agent, or Firm* — Global IP Counselors, LLP

(57) ABSTRACT

A liquid ejecting apparatus includes a supply section configured to selectively supply a first driving signal that drives a piezoelectric element to form an image or a second driving signal that drives the piezoelectric element to determine whether a foreign matter adheres to an inner wall of a nozzle opening, and a determination section that determines whether a foreign matter adheres to the inner wall. The second driving signal includes a first partial signal having its potential changed from a first potential to a second potential, and a second partial signal having its potential changed from the second potential to the first potential. The determination section determines, after the first partial signal is supplied to the piezoelectric element, based on vibration generated in the piezoelectric element due to supply of the second partial signal, whether a foreign matter adheres to the inner wall.

13 Claims, 16 Drawing Sheets

FIG. 8

| Sd[m] | CONTENT OF DESIGNATION OF Sd[m] | Qa[m] | | Qb[m] | | | Qs[m] | | |
|---|---|---|---|---|---|---|---|---|---|
| | | TQ1 | TQ2 | TSS1 | TSS2 | TSS3 | TSS1 | TSS2 | TSS3 |
| 1 | DP-1 | H | H | L | L | L | L | L | L |
| 2 | DP-2 | H | L | L | L | L | L | L | L |
| 3 | DP-3 | L | H | L | L | L | L | L | L |
| 4 | DP-4 | L | L | L | L | L | L | L | L |
| 5 | DH | L | L | H | L | H | L | H | L |

LIQUID EJECTING APPARATUS AND HEAD UNIT FOR DETERMINING PRESENCE OF FOREIGN MATTER

The present application is based on, and claims priority from JP Application Serial Number 2022-049443, filed Mar. 25, 2022, the disclosure of which is hereby incorporated by reference herein in its entirety.

BACKGROUND

1. Technical Field

The present disclosure relates to a liquid ejecting apparatus and a head unit.

2. Related Art

Liquid ejecting apparatuses, such as ink jet printers, eject, from a nozzle opening formed on an ejecting section, liquid, such as ink, charged in the ejecting section by driving a piezoelectric element disposed on the ejecting section included in the liquid ejecting apparatuses by a driving signal, so as to form an image on a medium, such as a recording sheet. In such a liquid ejecting apparatus, a nozzle opening may be clopped due to increased viscosity of liquid charged in an ejecting section, and therefore, the liquid may not be appropriately ejected, that is, an ejection error may occur. When the ejection error occurs, dots may not be appropriately formed on a medium by the liquid ejected from the ejecting section, and therefore, quality of an image formed on the medium is degraded. JP-A-2015-058540 proposes a technique of determining whether an ejection error has occurred in an ejecting section based on characteristics of vibration generated in a piezoelectric element driven by a driving signal, so that degradation of image quality due to an ejection error is suppressed.

However, according to general techniques, there arises a problem in that, when an ejection error has occurred due to attachment of a foreign matter on an inner wall of a nozzle opening, influence on characteristic of vibration generated on a piezoelectric element driven by a driving signal is negligible, and therefore, the determination as to whether an ejection error has occurred in an ejecting section may not be made.

SUMMARY

According to an aspect of the present disclosure, a liquid ejecting apparatus includes a supply section configured to selectively supply a first driving signal that drives a piezoelectric element to form an image on a medium by ejecting liquid from a nozzle opening or a second driving signal that drives the piezoelectric element to determine whether a foreign matter adheres to an inner wall of the nozzle opening, and a determination section that determines whether a foreign matter adheres to the inner wall. The second driving signal includes a first partial signal having its potential changed from a first potential to a second potential, and a second partial signal having its potential changed from the second potential to the first potential. The determination section determines, after the first partial signal is supplied to the piezoelectric element, based on vibration generated in the piezoelectric element due to supply of the second partial signal, whether a foreign matter adheres to the inner wall.

According to an aspect of the present disclosure, a head unit includes a supply section configured to selectively supply a first driving signal that drives a piezoelectric element to form an image on a medium by ejecting liquid from a nozzle opening or a second driving signal that drives the piezoelectric element to determine whether a foreign matter adheres to an inner wall of the nozzle opening, and a determination section that determines whether a foreign matter adheres to the inner wall. The second driving signal includes a first partial signal having its potential changed from a first potential to a second potential, and a second partial signal having its potential changed from the second potential to the first potential. The determination section determines, after the first partial signal is supplied to the piezoelectric element, based on vibration generated in the piezoelectric element due to supply of the second partial signal, whether a foreign matter adheres to the inner wall.

BRIEF DESCRIPTION OF THE DRAWINGS

FIG. 8 is a diagram illustrating an example of an individual designation signal.

DESCRIPTION OF EXEMPLARY EMBODIMENTS

Figure 1:
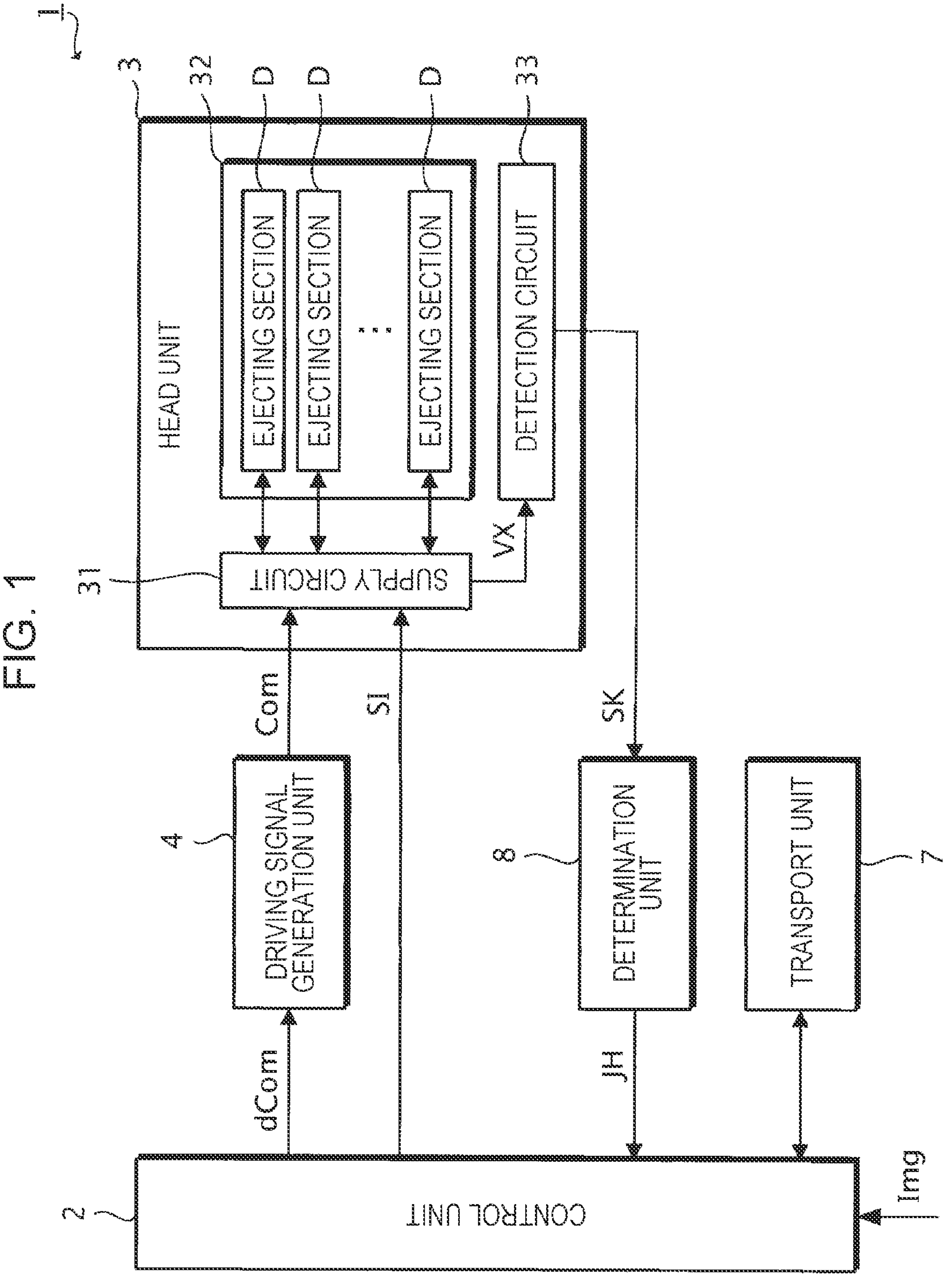
FIG. 1 is a block diagram illustrating an example of a configuration of an ink jet printer according to an embodiment of the present disclosure.

Hereinafter, an embodiment of the present disclosure will be described with reference to the accompanying drawings. Note that sizes and scales of individual sections appropriately differ from those of actual sections in the drawings. Furthermore, although technically preferred restrictions are added in embodiments below, since the embodiment is a preferred example of the present disclosure, the scope of the present disclosure is not limited to the embodiment unless description of restrictions on the present disclosure is particularly made in the following description.

A. Embodiment

In this embodiment, a liquid ejecting apparatus will be described taking an ink jet printer that forms an image on a recording sheet PP by ejecting ink as an example.

1. Outline of Ink Jet Printer

Hereinafter, an example of a configuration of an ink jet printer 1 according to this embodiment will be described with reference to FIGS. 1 to 3.

FIG. 1 is a functional block diagram illustrating an example of a configuration of the ink jet printer 1.

As illustrated in FIG. 1, print data Img indicating an image to be formed by the ink jet printer 1 is supplied from a host computer, such as a personal computer or a digital still camera, to the ink jet printer 1. The ink jet printer 1 executes a print process of forming the image indicated by the print data Img supplied from the host computer on the recording sheet PP.

As illustrated in FIG. 1, the ink jet printer 1 includes a control unit 2 that controls sections of the ink jet printer 1, a head unit 3 that includes ejecting sections D for ejecting ink, a driving signal generation unit 4 that generates a driving signal Com for driving the ejecting sections D, a transport unit 7 that changes a relative position of the recording sheet PP to the head unit 3, and a determination unit 8 that determines ejection states of ink in the ejecting sections D. Note that the ink jet printer 1 is an example of a "liquid ejecting apparatus", the ink is an example of "liquid", the recording sheet PP is an example of a "medium", the driving signal generation unit 4 is an example of a "generation section", and the determination unit 8 is an example of a "determination section".

It is assumed, in this embodiment, that the ink jet printer 1 includes at least one head unit 3, at least one driving signal generation unit 4 corresponding to the at least one head unit 3 on a one-to-one basis, and at least one determination unit 8 corresponding to the at least one head unit 3 on a one-to-one basis. Specifically, it is assumed, in this embodiment, that the ink jet printer 1 includes four head units 3, four driving signal generation units 4 corresponding to the four head units 3 on a one-to-one basis, and four determination units 8 corresponding to the four head units 3 on a one-to-one basis. Note that, for illustration purpose, one of the four head units 3, one of the four driving signal generation units 4 corresponding to the head unit 3, and one of the four determination units 8 corresponding to the head unit 3 are focused in a description below as illustrated in FIG. 1.

The control unit 2 includes at least one CPU. Note that the control unit 2 includes, instead of or in addition to the CPU, a programmable logic device, such as an FPGA. Here, CPU is an abbreviation of a central processing unit, and FPGA is an abbreviation of a field-programmable gate array. The control unit 2 further includes a memory. The memory is constituted by at least a volatile memory, such as a RAM (Random Access Memory), or a nonvolatile memory, such as a ROM (Read Only Memory), an EEPROM (Electrically Erasable Programmable Read-Only Memory), or a PROM (Programmable ROM).

Although described in detail below, the control unit 2 generates signals for controlling operations of the sections included in the ink jet printer 1, such as a print signal SI and a waveform designation signal dCom.

Here, the waveform designation signal dCom is a digital signal for prescribing a waveform of the driving signal Com. Furthermore, the driving signal Com is an analog signal for driving the ejecting sections D.

It is assumed, in this embodiment, that the driving signal Com includes a driving signal Com-A and a driving signal Com-B. In this embodiment, the driving signal Com-A is an example of a "first driving signal", and the driving signal Com-B is an example of a "second driving signal".

Furthermore, it is assumed, in this embodiment, that the waveform designation signal dCom includes a waveform designation signal dCom-A for prescribing a waveform of the driving signal Com-A and a waveform designation signal dCom-B for prescribing a waveform of the driving signal Com-B.

The driving signal generation unit 4 including a DA conversion circuit generates the driving signal Com having a waveform prescribed by the waveform designation signal dCom. Specifically, the driving signal generation unit 4 includes a driving signal generation circuit 4A that generates the driving signal Com-A based on the waveform designation signal dCom-A and a driving signal generation circuit 4B that generates the driving signal Com-B based on the waveform designation signal dCom-B.

Note that the driving signals Com-A and Com-B are collectively referred to as a driving signal Com-R where appropriate hereinafter. Furthermore, the driving signal generation circuits 4A and 4B are collectively referred to as a driving signal generation circuit 4R where appropriate hereinafter. Specifically, in this embodiment, the driving signal generation unit 4 includes two driving signal generation circuits 4R, that is, the driving signal generation circuits 4A and 4B. Furthermore, the waveform designation signals dCom-A and dCom-B are collectively referred to as a waveform designation signal dCom-R where appropriate hereinafter. The waveform designation signal dCom-R prescribes a waveform of the driving signal Com-R. Specifically, the driving signal generation circuit 4R generates the driving signal Com-R based on the waveform designation signal dCom-R.

Furthermore, the print signal SI is a digital signal for specifying a type of an operation of the ejecting sections D. Specifically, the print signal SI specifies a type of an operation of the ejecting sections D by determining whether the driving signal Com is to be supplied to the ejecting sections D.

As illustrated in FIG. 1, the head unit 3 includes a supply circuit 31, a recording head 32, and a detection circuit 33.

The recording head 32 includes M ejecting sections D. Here, the value M is a natural number equal to or larger than 1. Note that an m-th ejecting section D in the M ejecting sections D disposed on the recording head 32 is referred to as an ejecting section D[m] where appropriate hereinafter. Here, the value m is a natural number equal to or larger than 1 and equal to or smaller than M. Furthermore, when a component, a signal, or the like of the ink jet printer 1 corresponds to the ejecting section D[m] in the M ejecting sections D, an index [m] is assigned to a reference symbol representing the component, the signal, or the like where appropriate hereinafter.

The supply circuit 31 changes supply or non-supply of the driving signal Com to the ejecting section D[m] based on the print signal SI. Note that the supply circuit 31 is an example of a "supply section". Hereinafter, the driving signal Com to be supplied to the ejecting section D[m] is referred to as a supply driving signal Vin[m] where appropriate.

Furthermore, the supply circuit 31 determines whether a detection potential signal VX[m] indicating a potential of an upper electrode Zu[m] disposed on a piezoelectric element PZ[m] included in the ejecting section D[m] is to be supplied to the detection circuit 33 based on the print signal SI. Hereinafter, when the detection potential signal VX[m] is to be supplied to the detection circuit 33 from the ejecting section D[m], the ejecting section D[m] is referred to as a determination target ejecting section DH where appropriate. Note that the piezoelectric element PZ[m] and the upper electrode Zu[m] will be described hereinafter with reference to FIG. 3.

The detection circuit 33 generates a detection signal SK[m] based on the detection potential signal VX[m] supplied through the supply circuit 31 from the ejecting section D[m] serving as the determination target ejecting section DH. Specifically, the detection circuit 33 generates the detection signal SK[m] by amplifying the detection potential signal VX[m] and removing a noise component, for example.

The determination unit 8 determines whether ejection states of ink in the ejecting sections D are appropriate based on the detection signal SK[m]. That is, the determination unit 8 determines whether an ejection error has occurred in the ejecting sections D based on the detection signal SK[m]. Then the determination unit 8 generates determination information JH[m] indicating a result of the determination. Here, the term "ejection error" is a generic term of a state in which ink is not appropriately ejected from nozzle openings N included in the ejecting sections D. Examples of the ejection error include a state in which ink is not ejected from the ejecting section D[m], a state in which the ejecting section D[m] ejects ink of an amount different from an amount of ink prescribed by the driving signal Com, and a state in which the ejecting section D[m] ejects ink at a speed different from an ink ejection speed prescribed by the driving signal Com. Hereinafter, a process of determining an ejection state of the ejecting section D[m] based on the detection signal SK[m] is referred to as an ejection state determination process.

Furthermore, a process of driving the ejecting section D[m] as the determination target ejecting section DH, detecting a detection potential signal VX[m] from the ejecting section D[m], and generating a detection signal SK[m] based on the detected detection potential signal VX[m] is referred to as a determination target driving process.

When the determination target driving signal is executed, the control unit 2 generates a signal for controlling the head unit 3, such as the print signal SI. Furthermore, when the determination target driving process is executed, the control unit 2 generates a signal for controlling the driving signal generation unit 4, such as the waveform designation signal dCom. By this, the control unit 2 drives the ejecting section D[m] as the determination target ejecting section DH in the determination target driving process. Then the detection circuit 33 generates a detection signal SK[m] based on the detection potential signal VX[m] detected by the ejecting section D[m] driven as the determination target ejecting section DH in the determination target driving process.

Note that the ink jet printer 1 executes a print process as described above. When a print process is executed, the control unit 2 generates a signal for controlling the head unit 3, such as the print signal SI, based on the print data Img. Furthermore, when the print process is executed, the control unit 2 generates a signal for controlling the driving signal generation unit 4, such as the waveform designation signal dCom. The control unit 2 further generates a signal for controlling the transport unit 7 when the print process is executed. By this, the control unit 2 determines whether ink is to be ejected from the ejecting section D[m], controls an amount of ink to be ejected, an ink ejection timing, and the like, and controls the sections included in the ink jet printer 1 so that an image corresponding to the print data Img is formed on the recording sheet PP, while controlling the transport unit 7 so that a relative position of the recording sheet PP to the head unit 3 is shifted.

Figure 2:
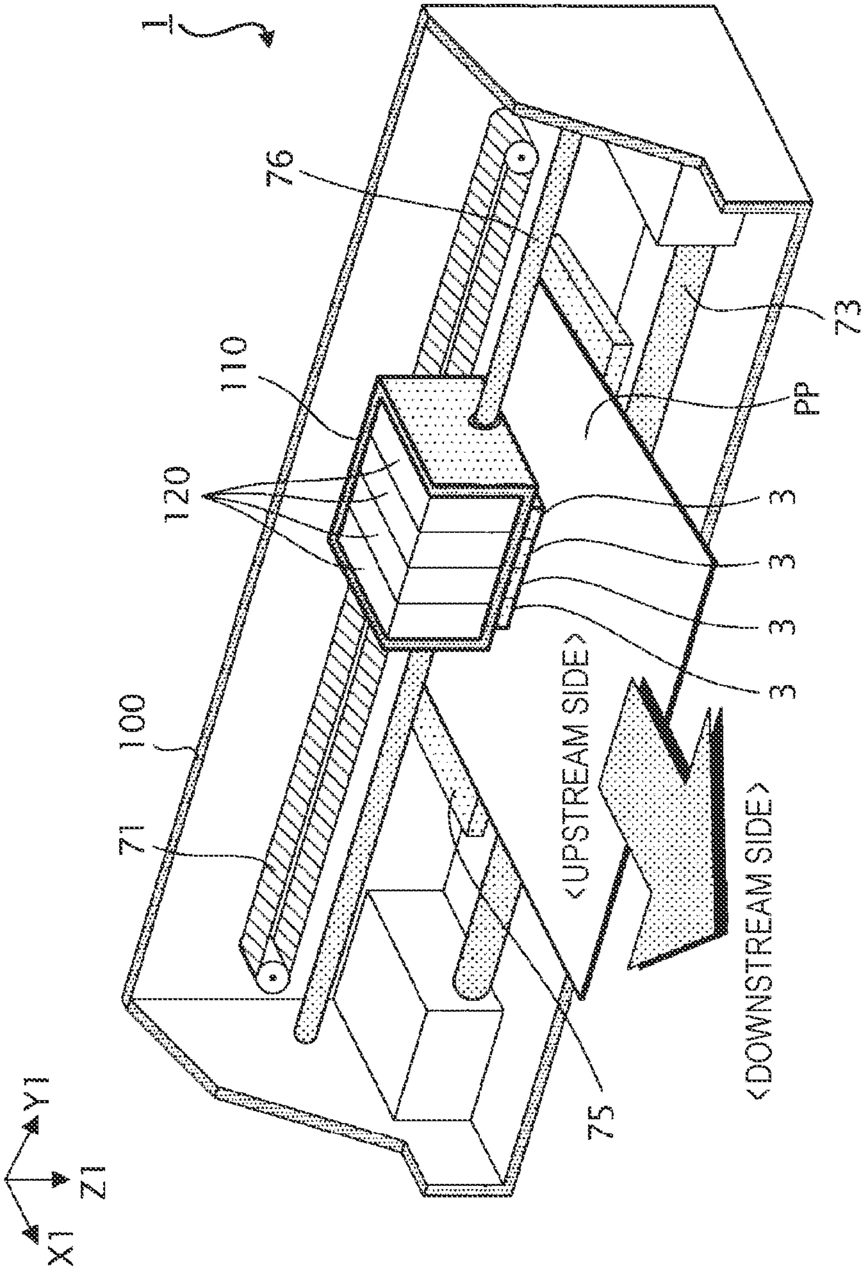
FIG. 2 is a perspective view schematically illustrating an example of an internal structure of the ink jet printer.

FIG. 2 is a perspective view schematically illustrating an example of an internal structure of the ink jet printer 1.

It is assumed, as illustrated in FIG. 2, the ink jet printer 1 is a serial printer in this embodiment. Specifically, when executing the print process, the ink jet printer 1 forms dots Dt corresponding to the print data Img on the recording sheet PP by ejecting ink from the ejecting section D[m] while the recording sheet PP is transported in an X1 direction and the head unit 3 reciprocates in a Y1 direction intersecting with the X1 direction and a Y2 direction opposite to the Y1 direction.

Hereinafter, the X1 direction and an X2 direction opposite to the X1 direction are collectively referred to as an "X direction", the Y1 direction and the Y2 direction opposite to the Y1 direction are collectively referred to as a "Y direction", and a Z1 direction intersecting with the X direction and the Y direction and a Z2 direction opposite to the Z1 direction are collectively referred to as a "Z direction". It is assumed, in this embodiment, that the X direction, the Y direction, and the Z direction are orthogonal to one another as an example. However, the present disclosure is not limited to this form. The X direction, the Y direction, and the Z direction at least intersect with one another. Note that it is assumed, in this embodiment, that the ejecting section D[m] ejects ink in the Z1 direction.

As illustrated in FIG. 2, the ink jet printer 1 of this embodiment includes a case 100, and a carriage 110 that is capable of reciprocating in the Y direction in the case 100 and includes four head units 3.

It is assumed, in this embodiment, that the carriage 110 stores four ink cartridges 120 corresponding to four color inks, that is, cyan, magenta, yellow, and black, on a one-to-one basis as illustrated in FIG. 2.

Furthermore, it is assumed, in this embodiment, that the ink jet printer 1 includes the four head units 3 corresponding to the four ink cartridges 120 on a one-to-one basis as described above. The individual ejecting sections D[m] receive supply of ink from the corresponding ink cartridges 120 corresponding to the head unit 3 including the ejecting sections D[m]. By this, the individual ejecting sections D[m] may store the supplied ink inside thereof and eject the stored ink through the nozzle openings N. Note that the ink cartridges 120 may be disposed outside the carriage 110.

Furthermore, as described above, the ink jet printer 1 according to this embodiment includes the transport unit 7. As illustrated in FIG. 2, the transport unit 7 includes a carriage transport mechanism 71 that reciprocates the carriage 110 in the Y direction, a carriage guide shaft 76 that supports the carriage 110 in a reciprocation available manner in the Y direction, a medium transport mechanism 73 that transports the recording sheet PP, and a platen 75 that is disposed on the carriage 110 in the Z1 direction. Therefore, when the print process is executed, the transport unit 7 causes the carriage transport mechanism 71 to reciprocate the head units 3 in the Y direction along the carriage guide shaft 76 together with the carriage 110, and causes the medium transport mechanism 73 to transport the recording sheet PP on the platen 75 in the X1 direction so as to change a relative position of the recording sheet PP to the head units 3, and accordingly, landing of the ink on the entire recording sheet PP is available.

Figure 3:
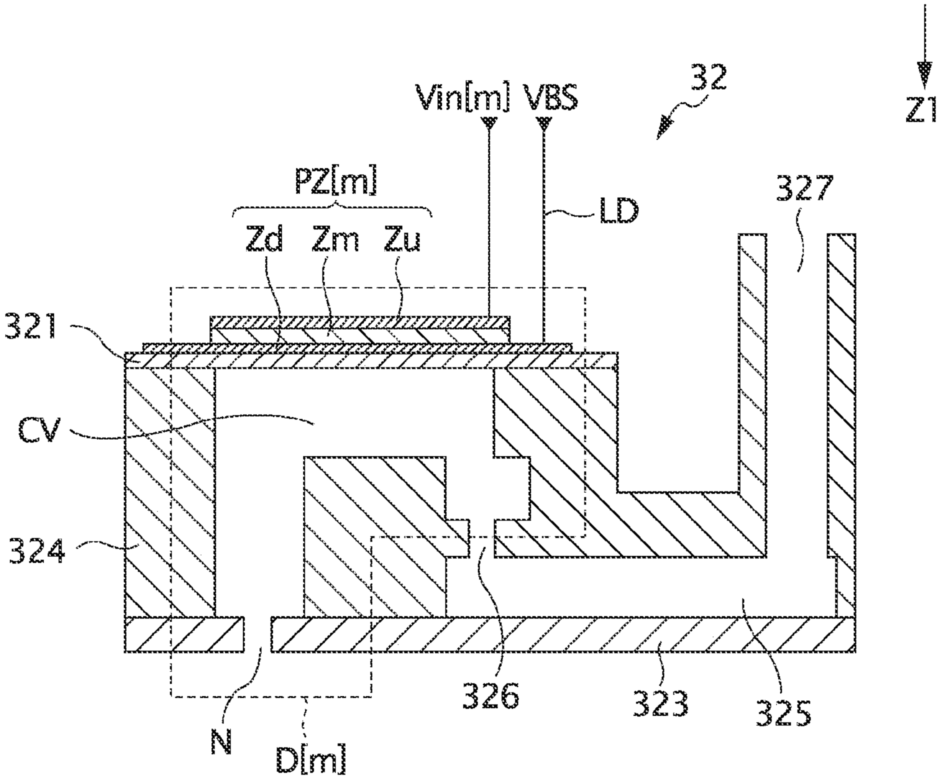
FIG. 3 is a cross sectional view of an example of a structure of an ejecting section.

FIG. 3 is a cross sectional view schematically illustrating a portion of the recording head 32 obtained by cutting the recording head 32 such that the ejecting section D[m] is included.

As illustrated in FIG. 3, the ejecting section D[m] includes the piezoelectric element PZ[m], a cavity CV including ink charged inside thereof, a nozzle opening N communicating with the cavity CV, and a vibration plate 321. The ejecting section D[m] ejects the ink in the cavity CV from the nozzle opening N when the piezoelectric element PZ[m] is driven by a supply driving signal Vin[m]. The cavity CV is a space defined by a cavity plate 324, a nozzle plate 323 having the nozzle opening N formed thereon, and the vibration plate 321. The cavity CV communicates with a reservoir 325 through an ink supply port 326. The reservoir 325 communicates with the ink cartridge 120 corresponding to the ejecting section D[m] through an ink intake port 327. The piezoelectric element PZ[m] includes an upper electrode Zu[m], a lower electrode Zd[m], and a piezoelectric body Zm[m] disposed between the upper electrode Zu[m] and the lower electrode Zd[m]. The lower electrode Zd[m] is electrically coupled with a power supply line LD having a predetermined potential VBS set thereto. When the supply driving signal Vin[m] is supplied to the upper electrode Zu[m] and a voltage is applied to a portion between the upper electrode Zu[m] and the lower electrode Zd[m], the piezoelectric element PZ[m] is shifted in the Z1 direction or the Z2 direction in accordance with the applied voltage, and as a result, the piezoelectric element PZ[m] is vibrated. The lower electrode Zd[m] is coupled to the vibration plate 321. Therefore, when the piezoelectric element PZ[m] is vibrated after being driven by the supply driving signal Vin[m], the vibration plate 321 is also vibrated. Then a volume of the cavity CV and a pressure in the cavity CV are changed due to the vibration of the vibration plate 321, and the ink charged in the cavity CV is ejected from the nozzle opening N.

2. Driving Signal Generation Unit

As described above, the driving signal generation unit 4 includes the two driving signal generation circuits 4R, that is, the driving signal generation circuits 4A and 4B. Hereinafter, the driving signal generation circuit 4R in the driving signal generation unit 4 will be briefly described.

Figure 4:
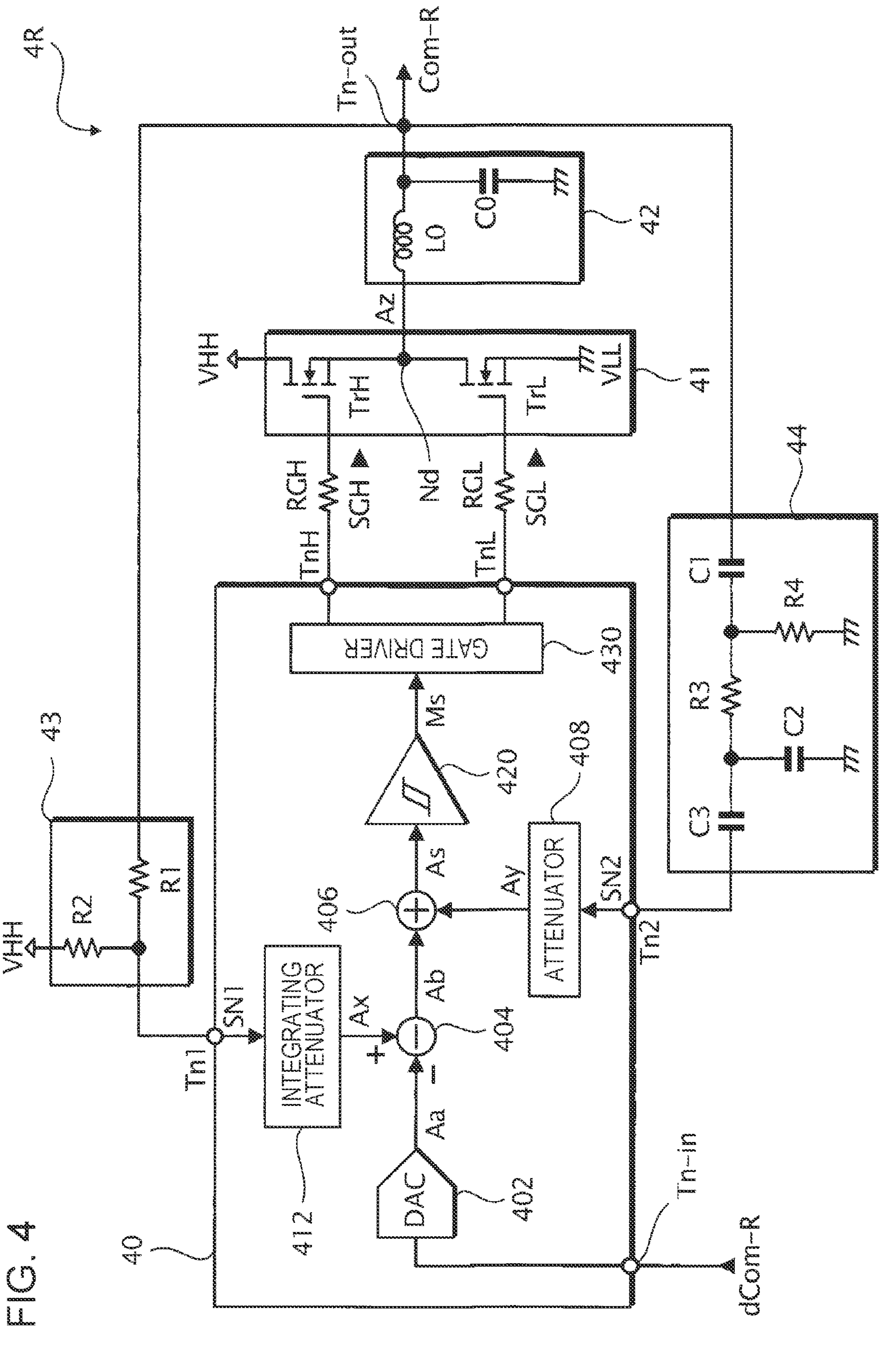
FIG. 4 is a block diagram illustrating an example of a configuration of a driving signal generation circuit.

FIG. 4 is a diagram illustrating an example of a configuration of the driving signal generation circuit 4R.

As illustrated in FIG. 4, the driving signal generation circuit 4R includes an integrated circuit 40, an amplification circuit 41, a smoothing circuit 42, a pull-up circuit 43, and a filter circuit 44 and generates a driving signal Com-R based on a waveform designation signal dCom-R.

The integrated circuit 40 is an LSI, that is, Large Scale Integration, for example, and generates a gate signal SGH and a gate signal SGL based on the waveform designation signal dCom-R. The integrated circuit 40 includes an analog conversion circuit 402, a subtractor 404, an adder 406, an attenuator 408, an integrating attenuator 412, a comparator 420, and a gate driver 430.

The analog conversion circuit 402 is a DAC, that is, a digital-to-analog converter, and converts the digital waveform designation signal dCom-R into an analog signal Aa. Note that a voltage amplitude of the signal Aa is approximately 0 volt to approximately 2 volts, for example, and this voltage is amplified to approximately 20 times so as to obtain the driving signal Com-R. Specifically, the signal Aa is obtained before the driving signal Com-R is amplified. The integrating attenuator 412 outputs a signal Ax obtained by attenuating and integrating a signal SN1 input to a terminal Tn1 described below.

The subtractor 404 outputs a signal Ab indicating a potential obtained by subtracting a potential of the signal Aa from a potential of the signal Ax.

The attenuator 408 outputs a signal Ay obtained by attenuating a high-frequency component of a signal SN2 input to a terminal Tn2 described below.

The adder 406 outputs a signal As indicating a potential obtained by adding a potential of the signal Ab to a potential of the signal Ay.

The comparator 420 outputs a modulation signal Ms obtained by performing pulse modulation on the signal As. Specifically, the comparator 420 outputs a modulation signal Ms that is in a high level when the signal As becomes equal to or larger than a threshold voltage Vth1 at a time of voltage rising and that is in a low level when the signal As becomes smaller than a threshold voltage Vth2 at a time of voltage falling. Note that the threshold voltages Vth1 and Vth2 are set such that the threshold voltage Vth1 is larger than the threshold voltage Vth2.

Note that a power source voltage of a circuit from the analog conversion circuit 402 to the comparator 420 is a low voltage of 3.3 volts, for example. On the other hand, the driving signal Com-R has a large amplitude and sometimes has over 40 volts, for example. Therefore, in the integrating attenuator 412, the signal SN1 having an amplitude corresponding to the driving signal Com-R is attenuated so that an amplitude range of the signal Ax fits an amplitude range of a signal in the circuit from the analog conversion circuit 402 to the comparator 420.

Furthermore, although a digital signal is illustrated as the waveform designation signal dCom-R in this embodiment, the waveform designation signal dCom-R at least prescribes a target value for generation of the driving signal Com-R, and the analog signal Aa may be used as the waveform designation signal dCom-R, for example. When the signal Aa is the waveform designation signal dCom-R, the integrated circuit 40 may not include the analog conversion circuit 402.

The gate driver 430 outputs the gate signal SGH obtained by converting the modulation signal Ms to have a specific amplitude to a terminal TnH. Furthermore, the gate driver 430 outputs the gate signal SGL obtained by converting a signal having a logical level that is reversed from a logical level of the modulation signal Ms to have a specific amplitude to a terminal TnL.

The amplification circuit 41 includes transistors TrH and TrL, for example, and generates an amplification signal Az obtained by amplifying the modulation signal Ms based on the gate signals SGH and SGL output from the integrated circuit 40. Note that it is assumed, in this embodiment, that the transistors TrH and TrL are N-channel field effect transistors, that is, FETs as an example.

The transistor TrH has a gate electrode to which the gate signal SGH output from the gate driver 430 is supplied through the terminal TnH and a resistor RGH.

The transistor TrL has a gate electrode to which the gate signal SGL output from the gate driver 430 is supplied through the terminal TnL and a resistor RGL. Logical levels of the gate signals SGH and SGL have the exclusive relationship from each other.

Here, the term "exclusive relationship from each other" indicates that a situation in which a signal level of the gate signal SGH supplied to the gate electrode of the transistor TrH and a signal level of the gate signal SGL supplied to the gate electrode of the transistor TrL are simultaneously brought into a high level does not occur, that is, a situation in which the transistors TrH and TrL are simultaneously turned on does not occur. Note that the transistor TrH is turned on when the gate electrode of the transistor TrH is in a high level, and turned off when the gate electrode of the transistor TrH is in a low level. Furthermore, the transistor TrL is turned on when the gate electrode of the transistor TrL is in a high level, and turned off when the gate electrode of the transistor TrL is in a low level.

The transistor TrH has a drain electrode electrically coupled to a power supply line having a power source potential VHH on a high potential side and has a source electrode electrically coupled to a node Nd.

The transistor TrL has a source electrode electrically coupled to a power supply line set to have a power source potential VLL on a low potential side, and has a drain electrode electrically coupled to the node Nd. Note that the potential VLL is lower than the potential VHH. The potential VLL may be a ground potential or the same as the potential VBS, for example.

As described above, the transistor TrH is turned on when the gate signal SGH supplied to the gate electrode is in a high level and turned off when the gate signal SGH is in a low level. Furthermore, the transistor TrL is turned on when the gate signal SGL supplied to the gate electrode is in a high level and turned off when the gate signal SGL is in a low level. Therefore, the amplification signal Az obtained by amplifying the modulation signal Ms is output to the node Nd that electrically couples the source electrode of the transistor TrH and the drain electrode of the transistor TrL to each other.

The smoothing circuit 42 is a low pass filter, that is, LPF, and generates the driving signal Com-R by smoothing the amplification signal Az. The smoothing circuit 42 includes an inductor L0 and a capacitor C0. The inductor L0 has one end electrically coupled to the node Nd and the other end electrically coupled to an output terminal Tn-out. The capacitor C0 has one end electrically coupled to the output terminal Tn-out and the other end electrically coupled to a power supply line having the potential VLL set thereto. The output terminal Tn-out outputs the driving signal Com-R obtained by smoothing the amplification signal Az.

The pull-up circuit 43 feeds backs the signal SN1 obtained by performing pull-up on the driving signal Com-R output to the output terminal Tn-out to the terminal Tn1. The pull-up circuit 43 includes a resistor R1 having one end electrically coupled to the output terminal Tn-out and the other end electrically coupled to the terminal Tn1 and a resistor R2 having one end electrically coupled to the terminal Tn1 and the other end electrically coupled to the power supply line having the potential VHH set thereto.

The filter circuit 44 is a band pass filter, that is, BPF, and feeds back the signal SN2 obtained by cutting a DC component from a frequency component of a predetermined band in the driving signal Com-R to the terminal Tn2. The filter circuit 44 includes a capacitor C1 having one end electrically coupled to the output terminal Tn-out and the other end electrically coupled to one end of a resistor R3, a resistor R4 having one end electrically coupled to the end of the resistor R3 and the other end electrically coupled to the power supply line having the potential VLL set therein, a capacitor C2 having one end electrically coupled to the other end of the resistor R3 and the other end electrically coupled to the power supply line having the potential VLL set thereto, and a capacitor C3 having one end electrically coupled to the other end of the resistor R3 and the other end electrically coupled to the terminal Tn2.

Among these components, the capacitor C1 and the resistor R4 function as a high pass filter, that is, HPF, that allows a high frequency component equal to or larger than a cutoff frequency in the driving signal Com-R to pass. Furthermore, the resistor R3 and the capacitor C2 function as a low pass filter, that is, LPF, that allows a low frequency component equal to or smaller than a cutoff frequency in the driving signal Com-R to pass. In this embodiment, the cutoff frequency of the HPF is lower than the cutoff frequency of the LPF in the filter circuit 44. Therefore, the filter circuit 44 allows a frequency component in the predetermined band that is equal to or higher than the cutoff frequency of the HPF and equal to or lower than the cutoff frequency of the LPF in the driving signal Com-R to pass. Furthermore, since the filter circuit 44 includes the capacitor C3, a signal obtained by cutting a DC component from a signal that has a frequency component in the predetermined band and that has passed the HPF and the LPF in the driving signal Com-R is fed back to the terminal Tn2.

In this way, the driving signal generation circuit 4R generates the driving signal Com-R by smoothing the amplification signal Az in the node Nd by the smoothing circuit 42. The driving signal Com-R is integrated and subtracted by the integrating attenuator 412 and then is fed back to the subtractor 404. Therefore, self-oscillation is performed at a frequency defined by a delay in the smoothing circuit 42, a delay in the integrating attenuator 412, and a feedback transfer function. Note that, since an amount of delay in a feedback path through the terminal Tn1 is large, a frequency of the self-oscillation may not be increased so that accuracy of a waveform of the driving signal Com-R is not sufficiently ensured only by the feedback through the terminal Tn1. On the other hand, since a path of the feedback of the high frequency component of the driving signal Com-R is provided through the terminal Tn2 separately from the path through the terminal Tn1 according to this embodiment, a delay of the feedback in the entire driving signal generation circuit 4R may be reduced. Specifically, since a frequency of the signal As obtained by adding a signal Ay that is a high frequency component of the driving signal Com-R to a signal Ab is set higher when compared with a case where a path through the terminal Tn2 does not exist according to this embodiment, accuracy of the driving signal Com-R may be sufficiently ensured.

3. Outline of Head Unit

Hereinafter, an outline of the head unit 3 will be described with reference to FIGS. 5 to 8.

Figure 5:
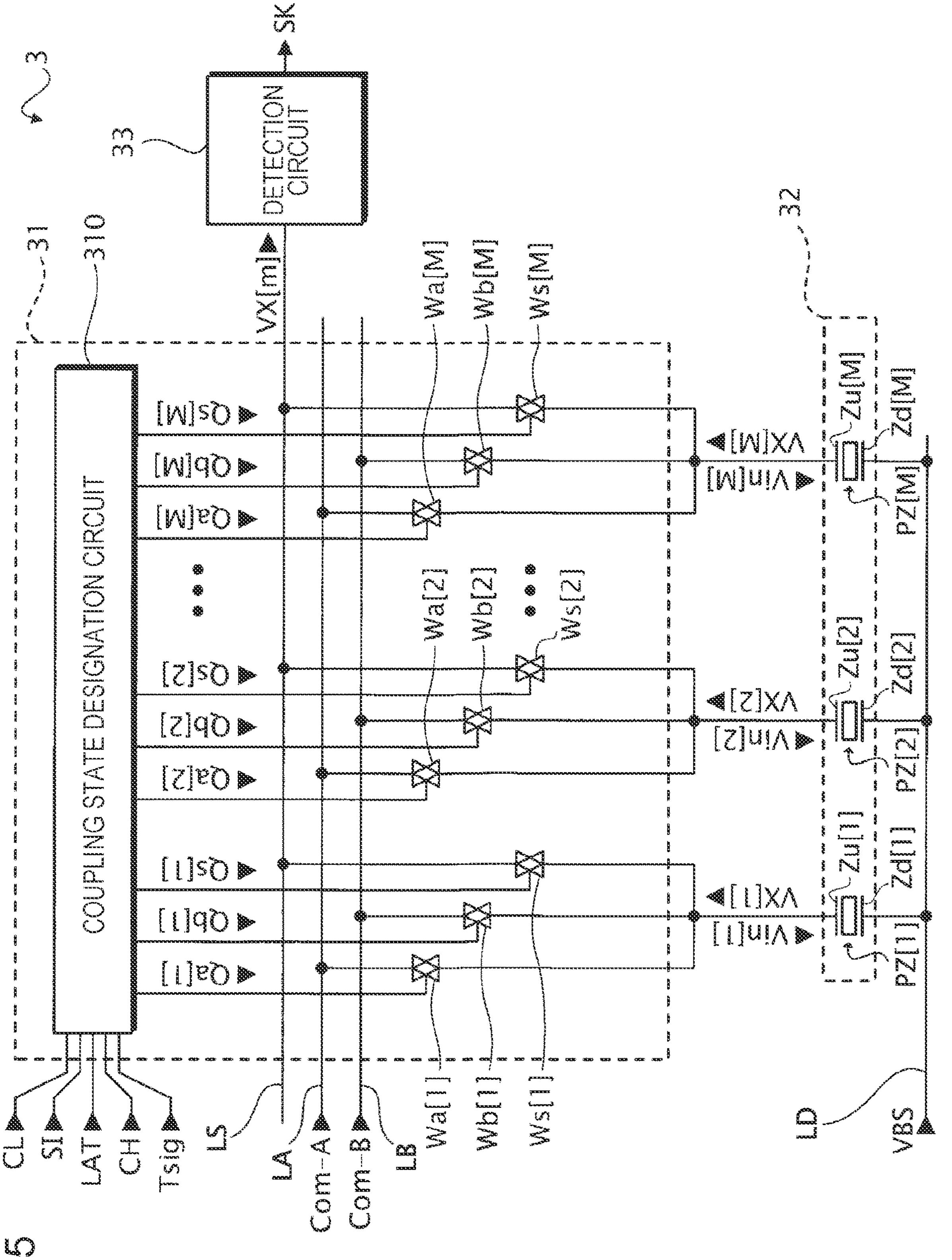
FIG. 5 is a block diagram illustrating an example of a configuration of a head unit.

FIG. 5 is a block diagram illustrating an example of a configuration of the head unit 3.

As illustrated in FIG. 5, the head unit 3 includes the supply circuit 31, the recording head 32, and the detection circuit 33. The head unit 3 further includes a line 1A that supplies the driving signal Com-A from the driving signal generation circuit 4A included in the driving signal generation unit 4, a line LB that supplies the driving signal Com-B from the driving signal generation circuit 4B included in the driving signal generation unit 4, and a line LS that supplies a detection potential signal VX[m] to the detection circuit 33.

As illustrated in FIG. 5, the supply circuit 31 includes M switches Wa[1] to Wa[M] corresponding to the M ejecting sections D[1] to D[M] on a one-to-one basis, M switches Wb[1] to Wb[M] corresponding to the M ejecting sections D[1] to D[M] on a one-to-one basis, M switches Ws[1] to Ws[M] corresponding to the M ejecting sections D[1] to D[M] on a one-to-one basis, and a coupling state designation circuit 310 that designates coupling states of the individual switches.

The coupling state designation circuit 310 generates a coupling state designation signal Qa[m] that designates On or Off of a switch Wa[m], a coupling state designation signal Qb[m] that specifies On or Off of a switch Wb[m], and a coupling state designation signal Qs[m] that specifies On or Off of a switch Ws[m] based on a print signal SI, a latch signal LAT, a change signal CH, and a period designation signal Tsig that are supplied from the control unit 2.

The switch Wa[m] switches between conduction and non-conduction of the line 1A and an upper electrode Zu[m] of a piezoelectric element PZ[m] based on the coupling state designation signal Qa[m]. In this embodiment, the switch Wa[m] is turned on when the coupling state designation signal Qa[m] is in a high level and is turned off when the coupling state designation signal Qa[m] is in a low level. When the switch Wa[m] is turned on, the driving signal Com-A supplied to the line 1A is supplied to the upper electrode Zu[m] of the ejecting section D[m] as a supply driving signal Vin[m].

The switch Wb[m] switches between conduction and non-conduction of the line LB and the upper electrode Zu[m] of the piezoelectric element PZ[m] based on the coupling state designation signal Qb[m]. In this embodiment, the switch Wb[m] is turned on when the coupling state designation signal Qb[m] is in a high level and is turned off when the coupling state designation signal Qb[m] is in a low level. When the switch Wb[m] is turned on, the driving signal Com-B supplied to the line LB is supplied to the upper electrode Zu[m] of the ejecting section D[m] as a supply driving signal Vin[m].

The switch Ws[m] switches between conduction and non-conduction of the line LS and the upper electrode Zu[m] of the piezoelectric element PZ[m] based on the coupling state designation signal Qs[m]. In this embodiment, the switch Ws[m] is turned on when the coupling state designation signal Qs[m] is in a high level and is turned off when the coupling state designation signal Qs[m] is in a low level. When the switch Ws[m] is turned on, a potential of the upper electrode Zu[m] in the ejecting section D[m] is supplied to the detection circuit 33 via the line LS as a detection potential signal VX[m].

In this embodiment, the detection circuit 33 generates a detection signal SK[m] having a waveform corresponding to a waveform of the detection potential signal VX[m] based on the detection potential signal VX[m] supplied from the line LS. Specifically, the detection circuit 33 generates a signal that is obtained by amplifying the detection potential signal VX[m] and removing a noise component from the detection potential signal VX[m] and outputs the generated signal as a detection signal SK[m].

When the ink jet printer 1 executes a print process or a determination target driving process, one or more unit periods TP are set as an operation period of the ink jet printer 1. The ink jet printer 1 may drive the individual ejecting sections D[m] for the print process or the determination target driving process in each unit period TP.

Figure 6:
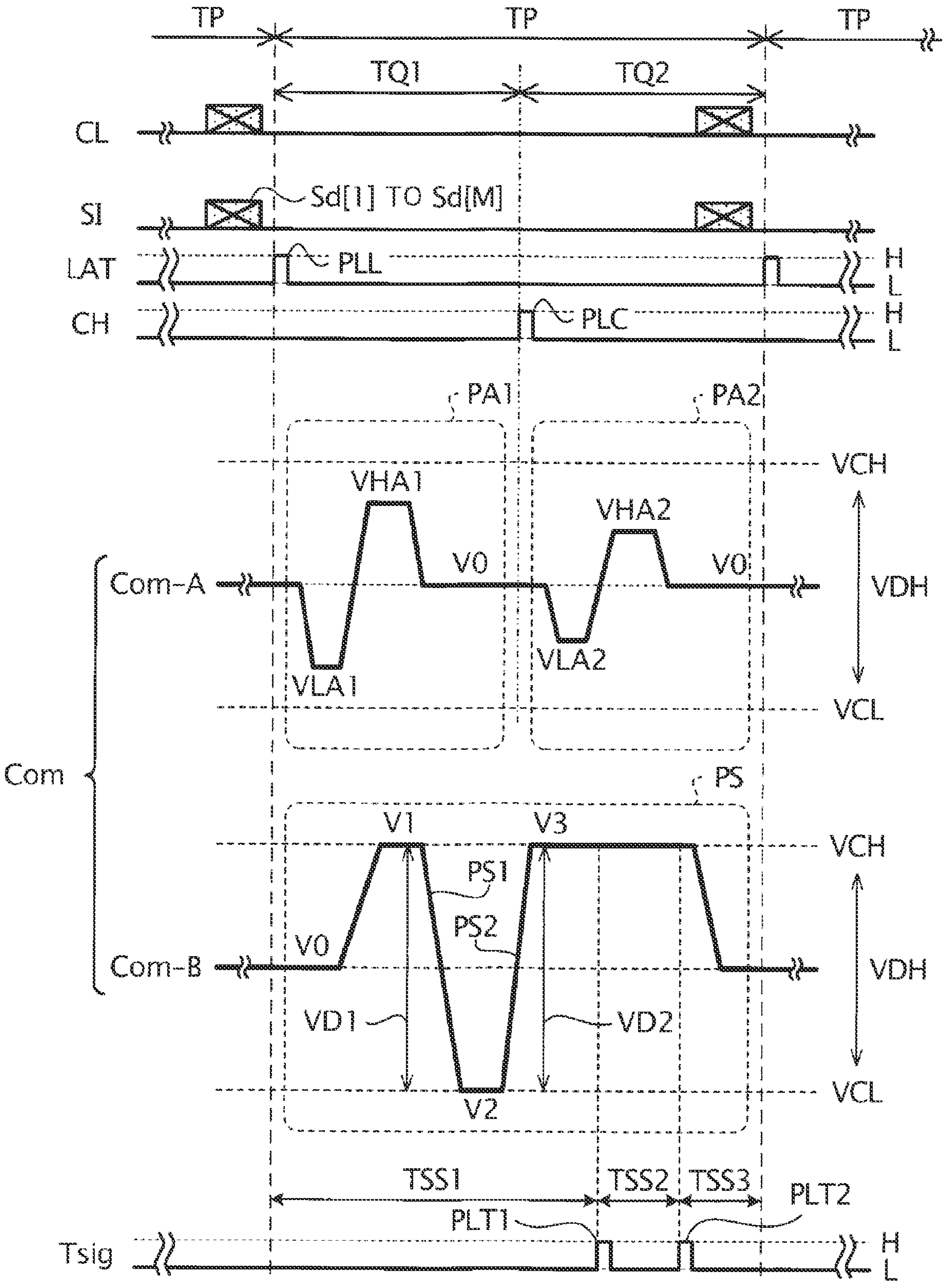
FIG. 6 is a timing chart of examples of signals supplied to the head unit.
Figure 7:
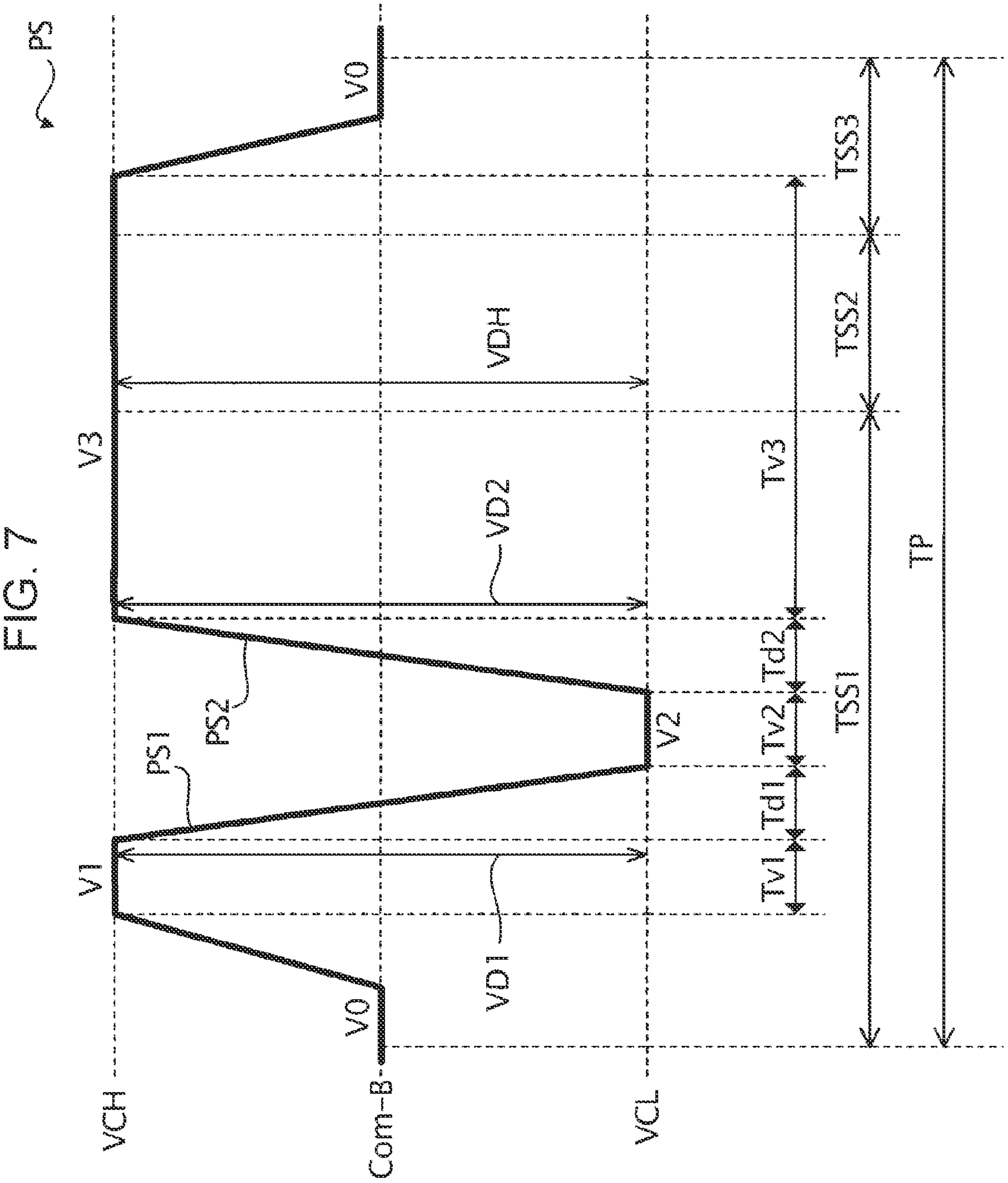
FIG. 7 is a timing chart of an example of a driving signal Com-B.

FIG. 6 is a timing chart of various signals, such as the driving signal Com, supplied to the head unit 3 in the unit period TP. FIG. 7 is a timing chart of the driving signal Com-B in the unit period TP.

As illustrated in FIG. 6, the control unit 2 outputs a latch signal LAT having a pulse PLL. Therefore, the control unit 2 defines the unit period TP as a period from a rising edge of the pulse PLL to a rising edge of a next pulse PLL.

The control unit 2 outputs a change signal CH having a pulse PLC in the unit period TP. The control unit 2 then divides the unit period TP into two driving periods: a driving period TQ1 from the rising edge of the pulse PLL to a rising edge of the pulse PLC, and the driving period TQ2 from the rising edge of pulse PLC to a rising edge of the next pulse PLL.

The control unit 2 further outputs a period designation signal Tsig having pulses PLT1 and PLT2 in the unit period TP. The control unit 2 then divides the unit period TP into a control period TSS1 from the rising edge of the pulse PLL to a rising edge of the pulse PLT1, a control period TSS2 from the rising edge of pulse PLT1 to a rising edge of the pulse PLT2, and a control period TSS3 from the rising edge of the pulse PLT2 to the rising edge of the next pulse PLL.

As illustrated in FIG. 6, the print signal SI includes M individual designation signals Sd[1] to Sd[M] corresponding one-to-one to the M ejecting sections D[1] to D[M]. The individual designation signal Sd[m] designates a manner of driving of the ejecting section D[m] in each unit period TP when the ink jet printer 1 executes the print process or the determination target driving process. Prior to each unit period TP, the control unit 2 supplies the print signal SI including the M individual designation signals Sd[1] to Sd[M] to the coupling state designation circuit 310 in synchronization with a clock signal CL. The coupling state designation circuit 310 generates the coupling state designation signal Qa[m], the coupling state designation signal Qb[m], and the coupling state designation signal Qs[m] based on the individual designation signal Sd[m] in the target unit period TP.

Note that, in this embodiment, when the ink jet printer 1 executes the print process, it is assumed that the ejecting section D[m] is capable of forming any of the following dots Dt: a large dot formed by ink with an ink amount ξ1, a medium dot formed by ink with an ink amount ξ2 that is less than the ink amount 1, and a small dot formed by ink with an ink amount ξ3 that is less than the ink amount ξ2. Furthermore, in this embodiment, when the ink jet printer 1 executes the determination target driving process, it is assumed that the ejecting section D[m] specified as the determination target ejecting section DH ejects ink of an ink amount ξ0, which is greater than the ink amount ξ1.

FIG. 8 is a diagram illustrating an example of the individual designation signal Sd[m].

As illustrated in FIG. 8, in this embodiment, the individual designation signal Sd[m] may have one of five values in the unit period TP in which the print process or the determination target driving process is executed, that is, a value "1" that designates the ejecting section D[m] as a large dot forming ejecting section DP-1, a value "2" that designates the ejecting section D[m] as a medium dot forming ejecting section DP-2, a value "3" that designates the ejecting section D[m] as a small dot forming ejecting section DP-3, a value "4" that designates the ejecting section D[m] as a dot non-forming ejecting section DP-4, and a value "5" that designates the ejecting section D[m] as a determination target ejecting section DH. Here, the large dot forming ejecting section DP-1 is the ejecting section D that forms large dots in the unit period TP. The medium dot forming ejecting section DP-2 is the ejecting section D that forms medium dots in the unit period TP. The small dot forming ejecting section DP-3 is the ejecting section D that forms small dots in the unit period TP. The dot non-forming ejecting section DP-4 is the ejecting section D that does not form any dot in the unit period TP.

The description is made with reference to FIGS. 6 and 7 again.

As illustrated in FIG. 6, the driving signal Com-A includes a waveform PA1 in the driving period TQ1 and a waveform PA2 in the driving period TQ2 according to this embodiment.

Of these, the waveform PA1 starts from a reference potential V0 and returns to the reference potential V0 through a potential VLA1 that is lower than the reference potential V0 and a potential VHA1 that is higher than the reference potential V0. The waveform PA1 is defined such that, when the supply driving signal Vin[m] having the waveform PA1 is supplied to the ejecting section D[m], ink of an ink amount φ1 is ejected from the ejecting section D[m].

Furthermore, the waveform PA2 starts from the reference potential V0 and returns to the reference potential V0 through a potential VLA2 that is lower than the reference potential V0, and a potential VHA2 that is higher than the reference potential V0. The waveform PA2 is defined such that, when the supply driving signal Vin[m] having the waveform PA2 is supplied to the ejecting section D[m], ink of an ink amount φ2 is ejected from the ejecting section D[m].

Note that it is assumed that the ink amount corresponds to a sum of the ink amounts φ1 and φ2, the ink amount 2 corresponds to the ink amount φ1, and the ink amount 3 corresponds to the ink amount φ2.

Furthermore, it is assumed that the potential VHA1 is higher than the potential VHA2 and the potential VLA1 is lower than the potential VLA2 as an example in this embodiment.

Furthermore, it is assumed, in this embodiment, that a volume of the cavity CV included in the ejecting section D[m] obtained when a potential of the supply driving signal Vin[m] supplied to the ejecting section D[m] is high is smaller than that obtained when the potential is low. Therefore, when the ejecting section D[m] is driven by the supply driving signal Vin[m] having the waveform PA1 and the like, ink in the ejecting section D[m] is ejected from the nozzle opening N when the potential of the supply driving signal Vin[m] changes from a low potential to a high potential.

As shown in FIGS. 6 and 7, in this embodiment, the driving signal Com-B has a waveform PS in the unit period TP.

Here, the waveform PS changes from the reference potential V0 to a potential V3 higher than the reference potential V0 through a potential V1 higher than the reference potential V0 and a potential V2 lower than the reference potential V0 in the control period TSS1, maintains the potential V3 in the control period TSS2, and changes from the potential V3 to the reference potential V0 in the control period TSS3.

Note that it is assumed, in this embodiment, that the potential V1 is substantially the same as the potential VCH, the potential V2 is substantially the same as the potential VCL, and the potential V3 is substantially the same as the potential VCH. In other words, it is assumed, in this embodiment, that the potential V1 and V3 are substantially the same potential, as an example.

Here, the concept of the term "substantially the same" includes a case where they are completely the same as well as a case where they may be regarded as the same taking an error into consideration. For example, the term "substantially the same" may be a case where they are the same in design. In this specification, when there is an error of 5 percent or less between two elements, the two elements are regarded to be identical and the two elements are considered to be substantially the same.

The potential VCH is a highest potential that may be supplied by the driving signal generation circuit 4R as the driving signal Com-R to the upper electrode Zu[m], and the potential VCL is a lowest potential that may be supplied by the driving signal generation circuit 4R as the driving signal Com-R to the upper electrode Zu[m]. For example, the potential VCH may be substantially the same as the potential VHH, and the potential VCL may be substantially the same as the potential VLL. Furthermore, for example, the potential VCH may be obtained by subtracting a voltage dropped due to the transistor TrH and a voltage dropped due to a transistor included in the switch Wa[m], the switch Wb[m], or the like from the potential VHH. Specifically, the potential VCH may be obtained by subtracting a voltage generated by an on-resistance of the transistor TrH and a voltage to be applied between a gate and a source of the transistor included in the switch Wa[m] or the switch Wb[m] to maintain the transistor in an on state from the potential VHH, for example. Furthermore, for example, the potential VCL may be obtained by adding a voltage dropped due to the transistor TrL and a voltage dropped due to the transistor included in the switch Wa[m], the switch Wb[m], or the like to the potential VLL. Specifically, the potential VCL may be obtained by adding a voltage generated by an on-resistance of the transistor TrL and a voltage to be applied between the gate and the source of the transistor included in the switch Wa[m] or the switch Wb[m] to maintain the transistor in an on state to the potential VLL, for example. Here, the potential VCH is an example of a "first potential" and the potential VCL is an example of a "second potential".

Furthermore, a portion of the waveform PS that changes from the potential V1 to the potential V2 is referred to as a partial waveform PS1, and a portion of the waveform PS that changes from the potential V2 to the potential V3 is referred to as a partial waveform PS2 hereinafter. Furthermore, a potential difference between the potentials V1 and V2 is referred to as a potential difference VD1, and a potential difference between the potentials V3 and V2 is referred to as a potential difference VD2 hereinafter. Furthermore, a potential difference between the potentials VCH and VCL is referred to as a potential difference VDH hereinafter. In the waveform PS according to this embodiment, the potential difference VD1 and the potential difference VD2 are substantially the same as the potential difference VDH.

Furthermore, a portion of the driving signal Com-B that corresponds to the partial waveform PS1 is referred to as a partial signal Com-PS1, and a portion of the driving signal Com-B that corresponds to the partial waveform PS2 is referred to as a partial signal Com-PS2 hereinafter. In other words, in this embodiment, the driving signal Com-B includes the partial signal Com-PS1 with the partial waveform PS1 and the partial signal Com-PS2 with the partial waveform PS2. Here, the partial signal Com-PS1 is an example of a "first partial signal" and the partial signal Com-PS2 is an example of a "second partial signal".

Furthermore, hereinafter, a period in the control period TSS1 during which the potential of the driving signal Com-B is maintained at the potential V1 is referred to as a period Tv1, a period in the control period TSS1 during which the partial waveform PS1 is formed and the potential of the driving signal Com-B changes from the potential V1 to the potential V2 is referred to as a period Td1, a period in the control period TSS1 during which the potential of the driving signal Com-B is maintained at the potential V2 is referred to as a period Tv2, and a period in the control period TSS1 during which the partial waveform PS2 is formed and the potential of the driving signal Com-B changes from the potential V2 to the potential V3 is referred to as a period Td2. Furthermore, a period in the unit period TP during which the potential of the driving signal Com-B is maintained at the potential V3 is referred to as a period Tv3.

It is assumed, in this embodiment, that the potential VHA1 is higher than the potential VHA2 and the potential VLA1 is lower than the potential VLA2 in the driving signal Com-A as described above. Specifically, it is assumed, in this embodiment, that the driving signal Com-A changes its potential in a range from the potential VLA1 to the potential VHA1, as an example. Here, the potential VLA1 is an example of a "third potential" and the potential VHA1 is an example of a "fourth potential".

Furthermore, it is assumed, in this embodiment, that the potential VCH is higher than the potentials VHA1 and VHA2 included in the driving signal Com-A, and the potential VLL is lower than the potentials VLA1 and VLA2 included in the driving signal Com-A. Specifically, in this embodiment, the potential VCH is not included in the range from the potential VLA1 to the potential VHA1 of the driving signal Com-A, or the potential VLL is not included in the range from the potential VLA1 to the potential VHA1 of the driving signal Com-A. In other words, in this embodiment, the highest potential of the driving signal Com-A is lower than the potential VCH which is the highest potential of the driving signal Com-B, and the lowest potential of the driving signal Com-A is higher than the potential VCL which is the lowest potential of the driving signal Com-B. Specifically, in this embodiment, a range of change in potential of the driving signal Com-A is encompassed by a range of change in potential of the driving signal Com-B.

Next, operation of the ejecting section D[m] designated by the individual designation signal Sd[m] will be described with reference to FIG. 8.

As illustrated in FIG. 8, when the individual designation signal Sd[m] indicates a value "1" that designates the ejecting section D[m] as the large dot forming ejecting section DP-1 in the unit period TP, the coupling state designation circuit 310 sets the coupling state designation signal Qa[m] to a high level in the driving periods TQ1 and TQ2. In this case, the switch Wa[m] is turned on in the driving periods TQ1 and TQ2. Therefore, the ejecting section D[m] is driven by the supply driving signal Vin[m] having the waveforms PA1 and PA2 in the unit period TP, and ejects ink of the ink amount 1 corresponding to a large dot.

Furthermore, when the individual designation signal Sd[m] indicates a value "2" that designates the ejecting section D[m] as the medium dot forming ejecting section DP-2 in the unit period TP, the coupling state designation circuit 310 sets the coupling state designation signal Qa[m] to a high level in the driving period TQ1. In this case, the switch Wa[m] is turned on during the driving period TQ1. Therefore, the ejecting section D[m] is driven by the supply driving signal Vin[m] having the waveform PA1 in the unit period TP, and ejects ink of the ink amount 2 corresponding to a medium dot.

Furthermore, when the individual designation signal Sd[m] indicates a value "3" that specifies the ejecting section D[m] as the small dot forming ejecting section DP-3 in the unit period TP, the coupling state designation circuit 310 sets the coupling state designation signal Qa[m] to a high level in the driving period TQ2. In this case, the switch Wa[m] is turned on during the driving period TQ2. Therefore, the ejecting section D[m] is driven by the supply driving signal Vin[m] having the waveform PA2 in the unit period TP, and ejects ink of the ink amount 3 corresponding to a small dot.

Furthermore, when the individual designation signal Sd[m] indicates a value "4" that designates the ejecting section D[m] as the dot non-forming ejecting section DP-4 in the unit period TP, the coupling state designation circuit 310 sets the coupling state designation signal Qa[m], the coupling state designation signal Qb[m], and the coupling state designation signal Qs[m] to a low level over the unit period TP. In this case, the switches Wa[m], Wb[m], and Ws[m] are turned off over the unit period TP. Therefore, the ejecting section D[m] is not driven by the supply driving signal Vin[m] in the unit period TP and does not eject ink.

Furthermore, when the individual designation signal Sd[m] indicates a value "5" that specifies the ejecting section D[m] as the determination target ejecting section DH in the unit period TP, the coupling state designation circuit 310 sets the coupling state designation signal Qb[m] to a high level in the control periods TSS1 and TSS3 and sets the coupling state designation signal Qs[m] to a high level in the control period TSS2. In this case, the switch Wb[m] is turned on in the control periods TSS1 and TSS3, and the switch Ws[m] is turned on in the control period TSS2. Therefore, vibration that occurs in the ejecting section D[m] remains also in the control period TSS2 as a result of the driving of the ejecting section D[m] designated as the determination target ejecting section DH by the supply driving signal Vin[m] having the partial waveforms PS1 and PS2 in the control period TSS1. Then, in the control period TSS2, when the vibration remains in the ejecting section D[m], the potential of the upper electrode Zu[m] in the ejecting section D[m] changes. The detection circuit 33 detects the potential of the upper electrode Zu[m] that changes in accordance with the vibration remaining in the ejecting section D[m] as a detection potential signal VX[m] via the switch Ws[m] in the control period TSS2.

In other words, the waveform of the detection potential signal VX[m] detected in the ejecting section D[m] in the control period TSS2 indicates a waveform of the vibration remaining in the ejecting section D[m] in the control period TSS2. Then the waveform of the detection signal SK[m] generated based on the detection potential signal VX[m] detected in the ejecting section D[m] in the control period TSS2 indicates a waveform of the vibration remaining in the ejecting section D[m] in the control period TSS2.

4. Validation Example

Hereinafter, driving signals Com-Bw and Com-Bz according to validation examples will be described with reference to FIGS. 9 and 16.

Figure 9:
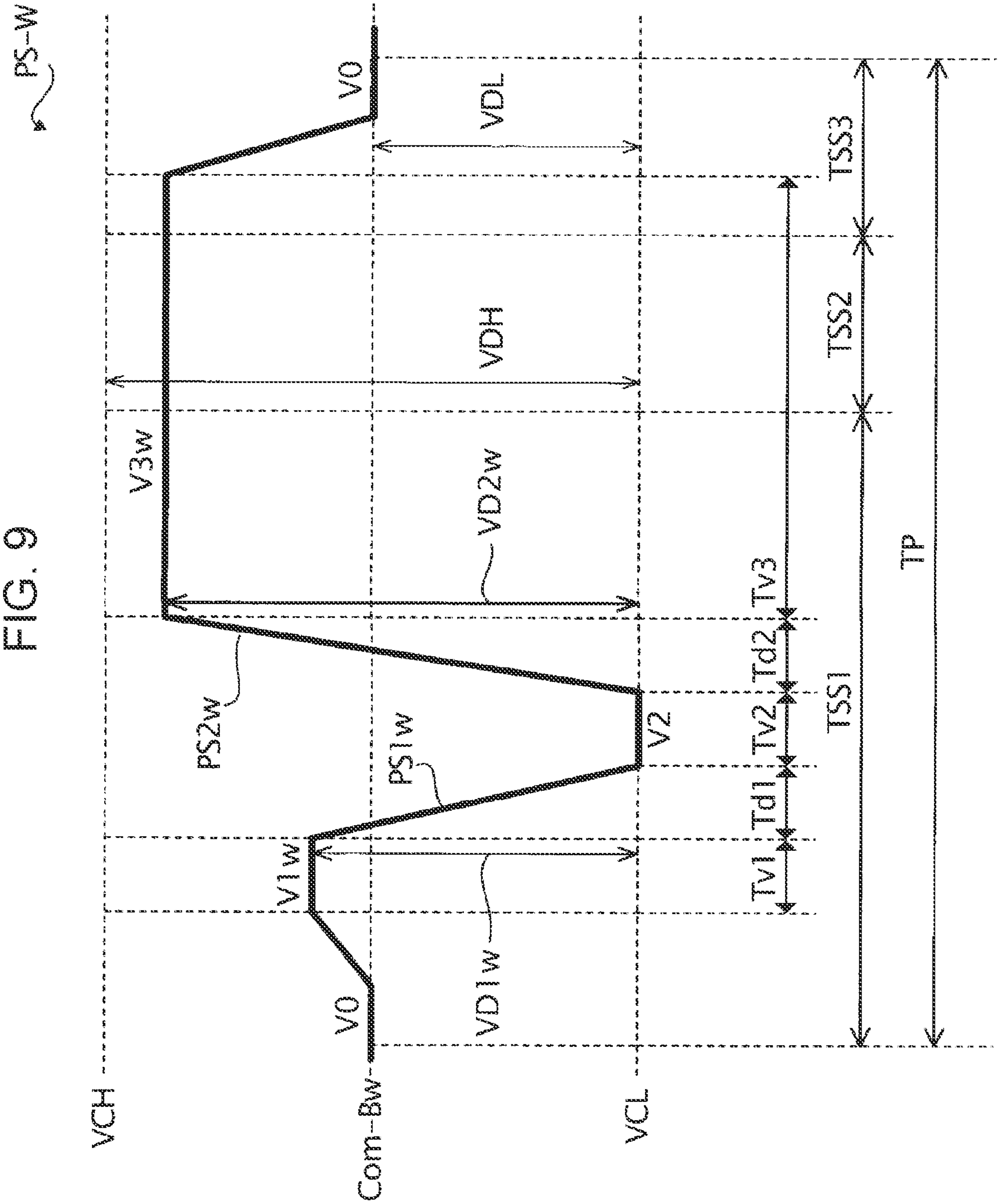
FIG. 9 is a timing chart of an example of a driving signal Com-Bw.

FIG. 9 is a timing chart of an example of the driving signal Com-Bw according to a first validation example.

As illustrated in FIG. 9, the driving signal Com-Bw includes a waveform PS-W in the unit period TP.

Here, the waveform PS-W changes from the reference potential V0 to a potential V3*w* higher than the reference potential V0 through a potential V1*w* higher than the reference potential V0 and a potential V2 lower than the reference potential V0 in the control period TSS1, maintains the potential V3*w* in the control period TSS2, and changes from the potential V3*w* to the reference potential V0 in the control period TSS3.

Note that it is assumed, in the first validation example, that the potential V1w satisfies "V0≤V1w≤VCH". Specifically, in the first validation example, when the potential V1w is closer to the reference potential V0 than the potential VCH, that is, the potential V1w satisfies "(V1w−V0)<(VCH−V1w)". Note that it is assumed, in the first validation example, that the potential V3w satisfies "V1w≤V3w≤VCH".

Furthermore, in the first validation example, a portion of the waveform PS-W that changes from the potential V1w to the potential V2 is referred to as a partial waveform PS1w, and a portion of the waveform PS-W that changes from the potential V2 to the potential V3w is referred to as a partial waveform PS2w. Furthermore, a potential difference between the potentials V1w and V2 is referred to as a potential difference VD1w, and a potential difference between the potentials V3w and V2 is referred to as a potential difference VD2w hereinafter. Furthermore, a potential difference between the reference potential V0 and the potential VCL is referred to as a potential difference VDL hereinafter.

Furthermore, a portion of the driving signal Com-Bw that corresponds to the partial waveform PS1w is referred to as a partial signal Com-PS1w, and a portion of the driving signal Com-Bw that corresponds to the partial waveform PS2w is referred to as a partial signal Com-PS2w in the first validation example. In other words, in the first validation example, the driving signal Com-Bw includes the partial signal Com-PS1w with the partial waveform PS1w and the partial signal Com-PS2w with the partial waveform PS2w.

Note that, in the first validation example, a potential of the driving signal Com-Bw is maintained at the potential V1w in the period Tv1 of the control period TSS1, the potential of the driving signal Com-Bw changes from the potential V1w to the potential V2 as the partial waveform PS1w in the period Td1 of the control period TSS1, the potential of the driving signal Com-Bw is maintained at the potential V2 in the period Tv2 of the control period TSS1, the potential of the driving signal Com-Bw changes from the potential V2 to the potential V3w as the partial waveform PS2w in the period Td2 of the control period TSS1, and the potential of the driving signal Com-Bw is maintained at the potential V3w in the period Tv3 of the unit period TP.

Figure 10:
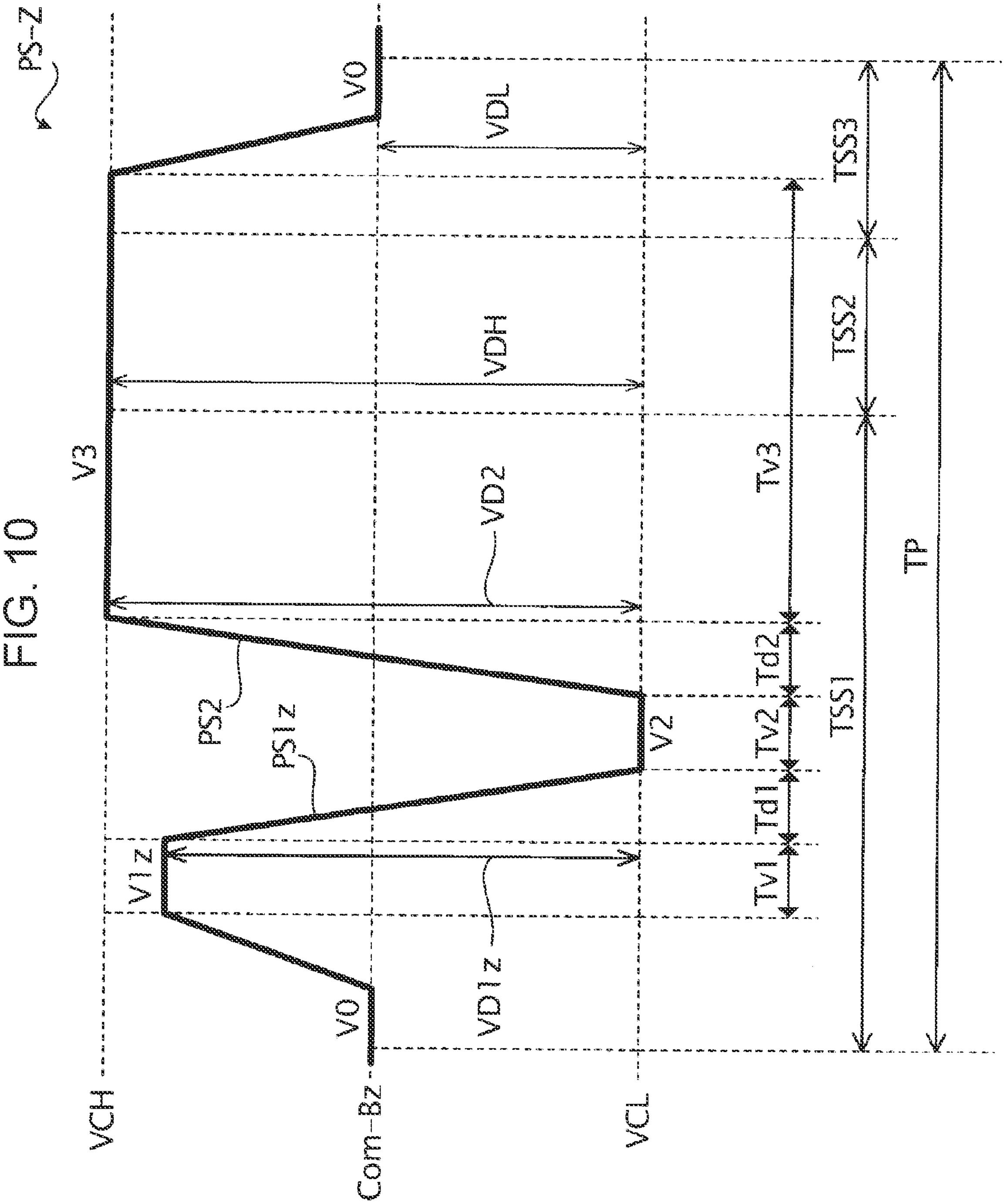
FIG. 10 is a timing chart of an example of a driving signal Com-Bz.

FIG. 10 is a timing chart of an example of the driving signal Com-Bz according to a second validation example.

As illustrated in FIG. 10, the driving signal Com-Bz includes a waveform PS-Z in the unit period TP.

Here, the waveform PS-Z changes from the reference potential V0 to a potential V3 higher than the reference potential V0 through a potential V1z higher than the reference potential V0 and a potential V2 lower than the reference potential V0 in the control period TSS1, maintains the potential V3 in the control period TSS2, and changes from the potential V3 to the reference potential V0 in the control period TSS3. Note that it is assumed, in the second validation example, that the potential V1z satisfies "V0≤V1z≤VCH".

Furthermore, in the second validation example, a portion of the waveform PS-Z that changes from the potential V1z to the potential V2 is referred to as a partial waveform PS1z, and a portion of the waveform PS-Z that changes from the potential V2 to the potential V3 is referred to as a partial waveform PS2. Furthermore, a potential difference between the potentials V1z and V2 is referred to as a potential difference VD1z hereinafter.

In the second validation example, a portion of the driving signal Com-Bz that corresponds to the partial waveform PS1z is referred to as a partial signal Com-PS1z. Specifically, in the second validation example, the driving signal Com-Bz includes the partial signal Com-PS1z with the partial waveform PS1z and the partial signal Com-PS2 with the partial waveform PS2.

Note that, in the second validation example, a potential of the driving signal Com-Bz is maintained at the potential V1z in the period Tv1 of the control period TSS1, the potential of the driving signal Com-Bz changes from the potential V1z to the potential V2 as the partial waveform PS1z in the period Td1 of the control period TSS1, the potential of the driving signal Com-Bz is maintained at the potential V2 in the period Tv2 of the control period TSS1, the potential of the driving signal Com-Bz changes from the potential V2 to the potential V3 as the partial waveform PS2 in the period Td2 of the control period TSS1, and the potential of the driving signal Com-Bz is maintained at the potential V3 in the period Tv3 of the unit period TP.

Next, an ejection error assumed in the validation examples will be described.

Figure 11:
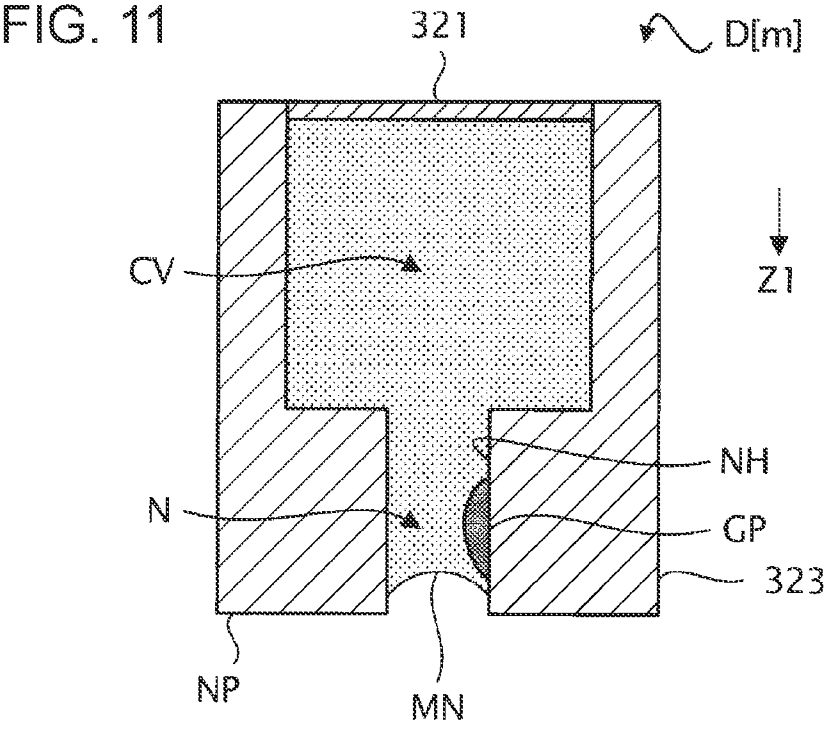
FIG. 11 is a cross sectional view illustrating an example of an ejection error in a first mode.
Figure 12:
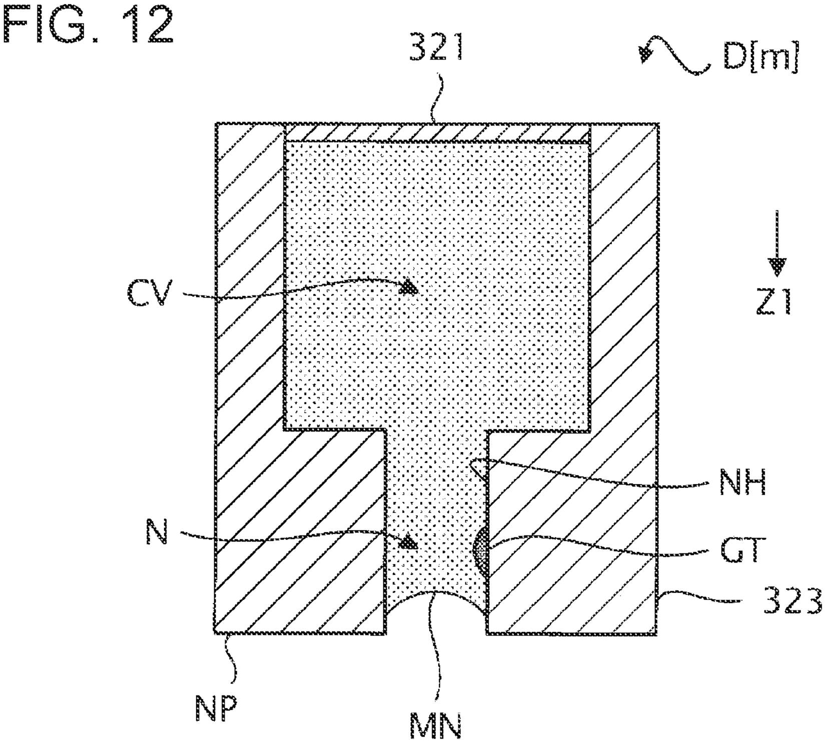
FIG. 12 is a cross sectional view illustrating an example of an ejection error in a second mode.

FIG. 11 is a diagram illustrating an ejection error in a first mode among ejection errors assumed in the validation examples. Furthermore, FIG. 12 is a diagram illustrating an ejection error in a second mode among the ejection errors assumed in the validation examples.

The ejection error in the first mode is caused by the adhesion and deposition of a foreign matter GP, such as paper dust or thickened ink, on the inner wall NH of the nozzle opening N of the ejecting section D[m], as illustrated in FIG. 11.

When the ejection error of the first mode occurs in the ejecting section D[m], ink droplets ejected from the nozzle opening N included in the ejecting section D[m] fly on a trajectory different from that obtained when an ejection state is appropriate, due to an adverse effect of the foreign matter GP adhering to the inner wall NH of the nozzle opening N. Therefore, when the ejection error of the first mode occurs in the ejecting section D[m], an ink droplet ejected from the ejecting section D[m] lands at a position different from a desired position on the recording sheet PP in the print process.

Note that, when the ejection error in the first mode occurs in the ejecting section D[m], when compared with a state in which an ejection state of ink in the ejecting section D[m] is appropriate, flow path resistance of the inner wall NH in the nozzle opening N is increased and a position of a liquid surface from which the ink droplet ejected from the nozzle opening N separates from the ink in the cavity CV included in the ejecting section D[m] changes in the Z2 direction, and therefore, a cycle of the vibration generated in the ejecting section D[m] is reduced.

Furthermore, the ejection error in the second mode is caused by the adhesion and deposition of a foreign matter GT, such as paper dust or thickened ink, on an inner wall NH of the nozzle opening N included in the ejecting section D[m], as illustrated in FIG. 12. Here, the foreign matter GT is deposited on the inner wall NH, similar to the foreign matter GP, and smaller than the foreign matter GP.

When the ejection error of the second mode occurs in the ejecting section D[m], ink droplets ejected from the nozzle opening N included in the ejecting section D[m] fly on a trajectory different from that obtained when an ejection state is appropriate, due to an adverse effect of the foreign matter GT adhering to the inner wall NH of the nozzle opening N. Therefore, when the ejection error of the second mode occurs in the ejecting section D[m], an ink droplet ejected from the ejecting section D[m] lands at a position different from a desired position on the recording sheet PP in the print process. Note that a magnitude of displacement of the landing position when the ejection error in the second mode occurs is smaller than a magnitude of displacement of the landing position when the ejection error in the first mode occurs.

Note that, when the ejection error in the second mode occurs in the ejecting section D[m], when compared with a state in which an ejection state of ink in the ejecting section D[m] is appropriate, flow path resistance of the inner wall NH in the nozzle opening N is increased and a position of a liquid surface from which the ink droplet ejected from the nozzle opening N separates from the ink in the cavity CV included in the ejecting section D[m] changes in the Z2 direction, and therefore, a cycle of the vibration generated in the ejecting section D[m] is reduced. Note that the foreign matter GP is larger than the foreign matter GT as described above. Therefore, the cycle of vibration generated in the ejecting section D[m] when the ejection error in the first mode occurs is shorter than the cycle of vibration generated in the ejecting section D[m] when the ejection error in the second mode occurs.

Next, a detection of an ejection error in the validation examples will be described.

Figure 13:
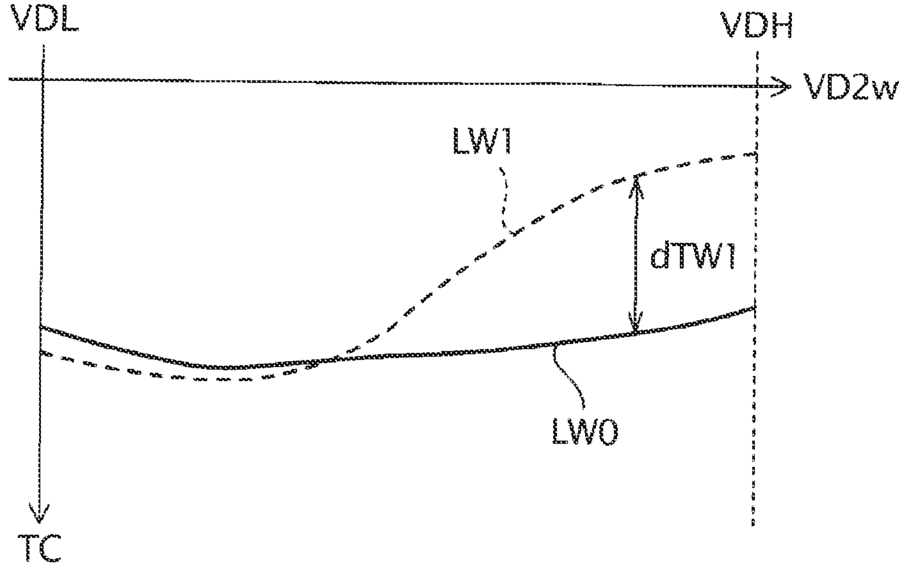
FIG. 13 is a graph of a cycle detected in a first validation example.

FIG. 13 is a diagram illustrating a cycle TC of the detection potential signal VX[m] detected in the ejecting section D[m] when the driving signal Com-Bw according to the first validation example is supplied to the ejecting section D[m] driven as the determination target ejecting section DH. Note that, in FIG. 13, in the driving signal Com-Bw according to the first validation example, a cycle TC of the detection potential signal VX[m] detected in the ejecting section D[m] driven by the driving signal Com-Bw is plotted while the potential difference VD2*w* is changed in a range from the potential difference VDL to the potential difference VDH by changing the potential V3*w* in a range from the reference potential V0 to the potential VCH. Specifically, in the graph illustrated in FIG. 13, an axis of abscissae indicates the potential difference VD2*w* included in the driving signal Com-Bw, and an axis of ordinates indicates the cycle TC of the detection potential signal VX[m] detected in the ejecting section D[m] driven by the driving signal Com-Bw.

Furthermore, in FIG. 13, a relation line LW0 indicates the relationship between the potential difference VD2*w* included in the driving signal Com-Bw supplied to the ejecting section D[m] and the cycle TC of the detection potential signal VX[m] when the ink ejection state in the ejecting section D[m] is appropriate. Furthermore, a relation line LW1 indicates the relationship between the potential difference VD2*w* included in the driving signal Com-Bw supplied to the ejecting section D[m] and the cycle TC of the detection potential signal VX[m] when the ejection error in the first mode occurs in the ejecting section D[m]. Furthermore, a difference value dTW1 is a difference value between the cycle TC indicated by the detection potential signal VX[m] detected in the ejecting section D[m] driven by the driving signal Com-Bw when the ejection error in the first mode occurs in the ejecting section D[m] and the cycle TC indicated by the detection potential signal VX[m] detected in the ejecting section D[m] driven by the driving signal Com-Bw when the ink ejection state in the ejecting section D[m] is appropriate.

As illustrated in FIG. 13, in the first validation example, a change width of the cycle TC indicated by the detection potential signal VX[m] obtained when the ejection error in the first mode occurs in the ejecting section D[m] and when the potential difference VD2*w* is changed is larger than a change width of the cycle TC indicated by the detection potential signal VX[m] obtained when the ink ejection state of the ejecting section D[m] is appropriate and when the potential difference VD2*w* is changed. Furthermore, in the first validation example, a difference value dTW1 obtained when the potential difference VD2*w* becomes closer to the potential difference VDH is larger than that obtained when the potential difference VD2 is closer to the potential difference VDL. Therefore, the potential difference VD2*w* that is close to the potential difference VDH is set so that the ejection error in the first mode is accurately detected using the driving signal Com-Bw according to the first validation example.

Figure 14:
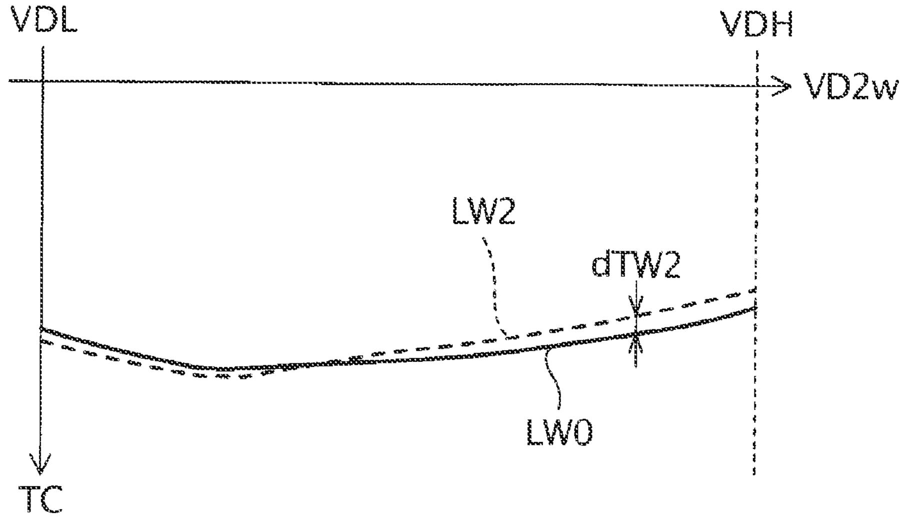
FIG. 14 is a graph of the cycle detected in the first validation example.

FIG. 14 is a diagram illustrating a cycle TC of the detection potential signal VX[m] detected in the ejecting section D[m] when the driving signal Com-Bw according to the first validation example is supplied to the ejecting section D[m] driven as the determination target ejecting section DH. Note that, in FIG. 14, as in FIG. 13, in the driving signal Com-Bw according to the first validation example, the cycle TC of the detection potential signal VX[m] detected in the ejecting section D[m] driven by the driving signal Com-Bw is plotted while the potential difference VD2*w* is changed in a range from the potential difference VDL to the potential difference VDH.

Furthermore, in FIG. 14, a relation line LW2 indicates the relationship between the potential difference VD2*w* included in the driving signal Com-Bw supplied to the ejecting section D[m] and the cycle TC of the detection potential signal VX[m] when the ejection error in the second mode occurs in the ejecting section D[m]. Furthermore, a difference value dTW2 is a difference value between the cycle TC indicated by the detection potential signal VX[m] detected in the ejecting section D[m] driven by the driving signal Com-Bw when the ejection error in the second mode occurs in the ejecting section D[m] and the cycle TC indicated by the detection potential signal VX[m] detected in the ejecting section D[m] driven by the driving signal Com-Bw when the ink ejection state in the ejecting section D[m] is appropriate.

As illustrated in FIG. 14, in the first validation example, a change width of the cycle TC indicated by the detection potential signal VX[m] obtained when the ejection error in the second mode occurs in the ejecting section D[m] and when the potential difference VD2*w* is changed is substantially the same as a change width of the cycle TC indicated by the detection potential signal VX[m] obtained when the ink ejection state of the ejecting section D[m] is appropriate and when the potential difference VD2*w* is changed. Specifically, in the first validation example, the difference value dTW2 obtained when the potential difference VD2*w* becomes closer to the potential difference VDH is substantially the same as the difference value dTW2 obtained when the potential difference VD2 is closer to the potential difference VDL. Therefore, even when the potential difference VD2*w* that is close to the potential difference VDH is set, it is difficult that the ejection error in the second mode is accurately detected using the driving signal Com-Bw according to the first validation example.

Figure 15:
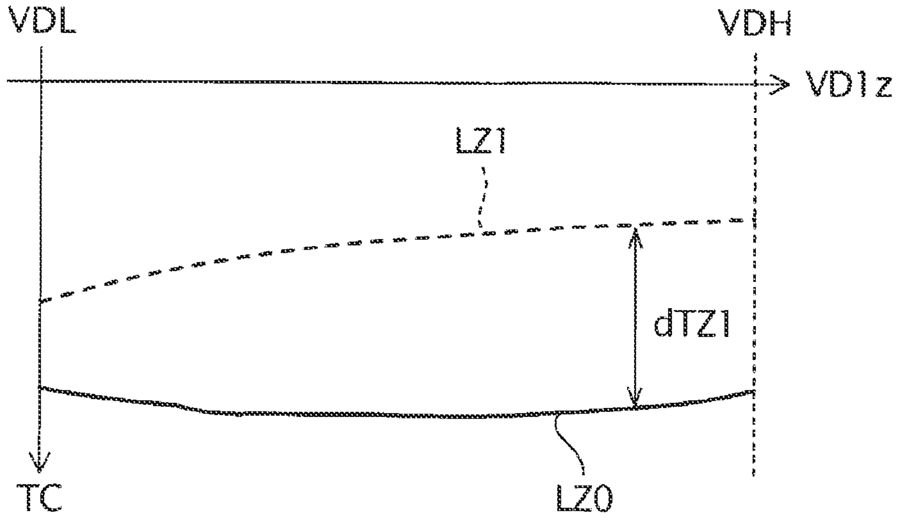
FIG. 15 is a graph of the cycle detected in a second validation example.

FIG. 15 is a diagram illustrating a cycle TC of the detection potential signal VX[m] detected in the ejecting section D[m] when the driving signal Com-Bz according to the second validation example is supplied to the ejecting section D[m] driven as the determination target ejecting section DH. Note that, in FIG. 15, in the driving signal Com-Bz according to the second validation example, a cycle TC of the detection potential signal VX[m] detected in the ejecting section D[m] driven by the driving signal Com-Bz is plotted while the potential difference VD1*z* is changed in a range from the potential difference VDL to the potential difference VDH by changing the potential V1*z* in a range from the reference potential V0 to the potential VCH. Specifically, in the graph illustrated in FIG. 15, an axis of abscissae indicates the potential difference VD1*z* included in the driving signal Com-Bz, and an axis of ordinates indicates the cycle TC of the detection potential signal VX[m] detected in the ejecting section D[m] driven by the driving signal Com-Bz.

Furthermore, in FIG. 15, a relation line LZ0 indicates the relationship between the potential difference VD1*z* included in the driving signal Com-Bz supplied to the ejecting section D[m] and the cycle TC of the detection potential signal VX[m] when the ink ejection state in the ejecting section D[m] is appropriate. Furthermore, a relation line LZ1 indicates the relationship between the potential difference VD1*z* included in the driving signal Com-Bz supplied to the ejecting section D[m] and the cycle TC of the detection potential signal VX[m] when the ejection error in the first mode occurs in the ejecting section D[m]. Furthermore, a difference value dTZ1 is a difference value between the cycle TC indicated by the detection potential signal VX[m] detected in the ejecting section D[m] driven by the driving signal Com-Bz when the ejection error in the first mode occurs in the ejecting section D[m] and the cycle TC indicated by the detection potential signal VX[m] detected in the ejecting section D[m] driven by the driving signal Com-Bz when the ink ejection state in the ejecting section D[m] is appropriate.

As illustrated in FIG. 15, in the second validation example, a change width of the cycle TC indicated by the detection potential signal VX[m] obtained when the ejection error in the first mode occurs in the ejecting section D[m] and when the potential difference VD1*z* is changed is substantially the same as a change width of the cycle TC indicated by the detection potential signal VX[m] obtained when the ink ejection state of the ejecting section D[m] is appropriate and when the potential difference VD1*z* is changed. However, in the second validation example, a difference value dTZ1 obtained when the potential difference VD1*z* becomes closer to the potential difference VDH is larger than that obtained when the potential difference VD2 is closer to the potential difference VDL. Therefore, the potential difference VD1*z* that is close to the potential difference VDH is preferably set so that the ejection error in the first mode is accurately detected using the driving signal Com-Bz according to the second validation example. Note that, in the second validation example, the difference value dTZ1 is large regardless of the potential difference VD1*z*. Therefore, using the driving signal Com-Bz according to the second validation example, the ejection error in the first mode may be detected irrespective of the potential difference VD1*z*.

Figure 16:
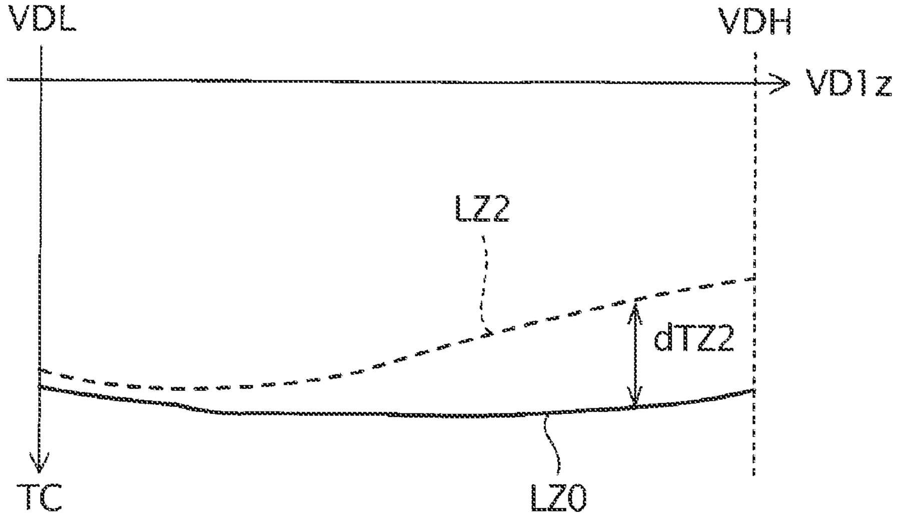
FIG. 16 is a graph of the cycle detected in the second validation example.

FIG. 16 is a diagram illustrating a cycle TC of the detection potential signal VX[m] detected in the ejecting section D[m] when the driving signal Com-Bz according to the second validation example is supplied to the ejecting section D[m] driven as the determination target ejecting section DH. Note that, in FIG. 16, as in FIG. 15, in the driving signal Com-Bz according to the second validation example, a cycle TC of the detection potential signal VX[m] detected in the ejecting section D[m] driven by the driving signal Com-Bz is plotted while the potential difference VD1*z* is changed in a range from the potential difference VDL to the potential difference VDH.

Furthermore, in FIG. 16, a relation line LZ2 indicates the relationship between the potential difference VD1*z* included in the driving signal Com-Bz supplied to the ejecting section D[m] and the cycle TC of the detection potential signal VX[m] when the ejection error in the second mode occurs in the ejecting section D[m]. Furthermore, a difference value dTZ2 is a difference value between the cycle TC indicated by the detection potential signal VX[m] detected in the ejecting section D[m] driven by the driving signal Com-Bz when the ejection error in the second mode occurs in the ejecting section D[m] and the cycle TC indicated by the detection potential signal VX[m] detected in the ejecting section D[m] driven by the driving signal Com-Bz when the ink ejection state in the ejecting section D[m] is appropriate.

As illustrated in FIG. 16, in the second validation example, a change width of the cycle TC indicated by the detection potential signal VX[m] obtained when the ejection error in the second mode occurs in the ejecting section D[m] and when the potential difference VD1*z* is changed is larger than a change width of the cycle TC indicated by the detection potential signal VX[m] obtained when the ink ejection state of the ejecting section D[m] is appropriate and when the potential difference VD1*z* is changed. Specifically, in the second validation example, the difference value dTZ1 obtained when the potential difference VD1*z* becomes closer to the potential difference VDH is larger than the difference value dTZ1 obtained when the potential difference VD1*z* is closer to the potential difference VDL. Therefore, the potential difference VD1*z* that is close to the potential difference VDH is set so that the ejection error in the second mode is accurately detected using the driving signal Com-Bz according to the second validation example.

The driving signal Com-B according to this embodiment is obtained by setting the potential V1*z* to the potential VCH and potential difference VD1*z* to the potential difference VDH in the driving signal Com-Bz according to the second validation example. Specifically, the driving signal Com-B according to this embodiment has the partial waveform PS1 that changes its potential by the potential difference VDH from the potential VCH to the potential V2. On the other hand, the driving signal Com-Bw according to the first validation example has the partial waveform PS1*w* that changes its potential by the potential difference VD1*w* from the potential V1*w*, which is closer to the reference potential V0 than potential VCH, to the potential V2. Specifically, the potential difference VDH included in the partial waveform PS1 according to this embodiment is larger than the potential difference VD1*w* included in the partial waveform PS1*w* according to the first validation example. Therefore, the partial waveform PS1 in this embodiment can draw the meniscus MN strongly in the Z2 direction when compared with the partial waveform PS1*w* in the first validation example. As a result, the driving signal Com-B according to this embodiment can generate a larger vibration in the ejecting section D[m] driven as the determination target ejecting section DH when compared with the driving signal Com-Bw according to the first validation example. Therefore, by using the driving signal Com-B according to this embodiment, both the ejection error in the first mode and the ejection error in the second mode may be accurately detected.

Note that, in the determination target driving process according to this embodiment, the control unit 2 drives the ejecting section D[m] as the determination target ejecting section DH by the driving signal Com-B and causes the ejecting section D[m] to output the detection potential signal VX[m] to the detection circuit 33. Then the detection circuit 33 generates the detection signal SK[m] based on the detection potential signal VX[m] detected in the ejecting section D[m] in the determination target driving process.

Thereafter, in the ejection state determination process, the determination unit 8 determines whether the cycle TC indicated by the detection potential signal VX[m] is equal to or larger than a threshold value TC−th1, which is a non-negative real number, based on the detection signal SK[m] output from the detection circuit 33. When the cycle TC of the detection potential signal VX[m] is equal to or larger than the threshold value TC−th1, the determination unit 8 generates the determination information JH[m] indicating that the ink discharge state in the ejecting section D[m] is appropriate, and supplies the determination information JH[m] to the control unit 2. Furthermore, when the cycle TC of the detection potential signal VX[m] is smaller than the threshold value TC−th1, the determination unit 8 determines whether the cycle TC indicated by the detection potential signal VX[m] is equal to or larger than the threshold value TC−th2, which is a real number smaller than the threshold value TC−th1. When the cycle TC of the detection potential signal VX[m] is equal to or larger than the threshold value TC−th2, the determination unit 8 generates determination information JH[m] indicating that the ejection error in the second mode has occurred in the ejecting section D[m], and supplies the determination information JH[m] to the control unit 2. On the other hand, when the cycle TC of the detection potential signal VX[m] is smaller than the threshold value TC−th2, the determination unit 8 generates the determination information JH[m] indicating that the ejection error in the first mode has occurred in the ejecting section D[m], and supplies the determination information JH[m] to the control unit 2.

Thus, in this embodiment, by driving the ejecting section D[m] by the driving signal Com-B, it may be determined whether the ink ejection state in the ejecting section D[m] is appropriate, and it may be determined, when an ejection error has occurred in the ejecting section D[m], whether the ejection error is in the first mode or the second mode.

5. Conclusion of Embodiment

As described above, the ink jet printer 1 according to this embodiment includes the supply circuit 31 capable of supplying the driving signal Com-A that drives the piezoelectric element PZ[m] for forming an image on the recording sheet PP by ejecting ink from the nozzle opening N or the driving signal Com-B that drives the piezoelectric element PZ[m] to determine whether a foreign matter GT has been attached to the inner wall NH of the nozzle opening N to the piezoelectric element PZ[m] in a selectable manner and a determination unit 8 that determines whether the foreign matter GT has been attached to the inner wall NH. The driving signal Com-B includes the partial signal Com-PS1 that changes its potential from the potential VCH to the potential VCL and the partial signal Com-PS2 that changes its potential from the potential VCL to the potential VCH. The determination unit 8 determines whether the foreign matter GT has been attached to the inner wall NH based on vibration generated in the piezoelectric element PZ[m] due to supply of the partial signal Com-PS2 after supply of the partial signal Com-PS1 to the piezoelectric element PZ[m].

Therefore, according to this embodiment, the potential of the partial signal Com-PS1 may be considerably changed, and in addition, the potential of the partial signal Com-PS2 may be considerably changed. Therefore, according to this embodiment, the driving signal Com-B may significantly drive the piezoelectric element PZ[m]. Therefore, according to this embodiment, an ejection error caused by the foreign matter GT adhering to the inner wall NH of the nozzle opening N may be accurately detected.

Furthermore, in this embodiment, the driving signal Com-A may change its potential in a range from the potential VLA1 to the potential VHA1 to drive the piezoelectric element PZ[m] so that ink is ejected from the nozzle opening N, and the potential VCH and the potential VCL may not be included in the range from the potential VLA1 to the potential VHA1.

Therefore, according to this embodiment, the potential of the partial signal Com-PS1 may be considerably changed and the potential of the partial signal Com-PS2 may be considerably changed, and therefore, the ejection error caused by the foreign matter GT adhering to the inner wall NH of the nozzle opening N may be accurately detected.

Furthermore, according to this embodiment, the potential VCH is a highest potential that may be supplied to the piezoelectric element PZ[m] via the supply circuit 31 among potentials that may be generated by the driving signal generation unit 4 that generates the driving signals Com-A and Com-B, and the potential VCL is a lowest potential that may be supplied to the piezoelectric element PZ[m] via the supply circuit 31 among the potentials that may be generated by the driving signal generation unit 4.

Therefore, according to this embodiment, the potential of the partial signal Com-PS1 may be considerably changed and the potential of the partial signal Com-PS2 may be considerably changed, and therefore, the ejection error caused by the foreign matter GT adhering to the inner wall NH of the nozzle opening N may be accurately detected.

Moreover, in this embodiment, a displacement amount of the meniscus MN at the nozzle opening N when the driving signal Com-B is supplied to the ejecting section D[m] and the piezoelectric element PZ[m] is driven may be larger than a displacement amount of the meniscus MN at the nozzle opening N when the driving signal Com-A is supplied to the ejecting section D[m] and the piezoelectric element PZ[m] is driven.

B. Modifications

The individual forms above may be variously modified. Specific modifications are illustrated below. Two or more forms that are arbitrarily selected from among examples below may be appropriately combined as long as the forms are consistent. Note that components having the same operations or the same functions as those in the embodiment are denoted by reference numerals used in the description of the embodiment and detailed descriptions thereof are appropriately omitted.

First Modification

Although the example in which the driving signal Com-B is maintained at the potential V3 during the period from the end of the period Td2 including the partial waveform PS2 to the start of the control period TSS2 is illustrated, the present disclosure is not limited to this form. For example, the potential of the driving signal Com-B may change during a period from the end of the period Td2 including the partial waveform PS2 to the start of the control period TSS2.

Figure 17:
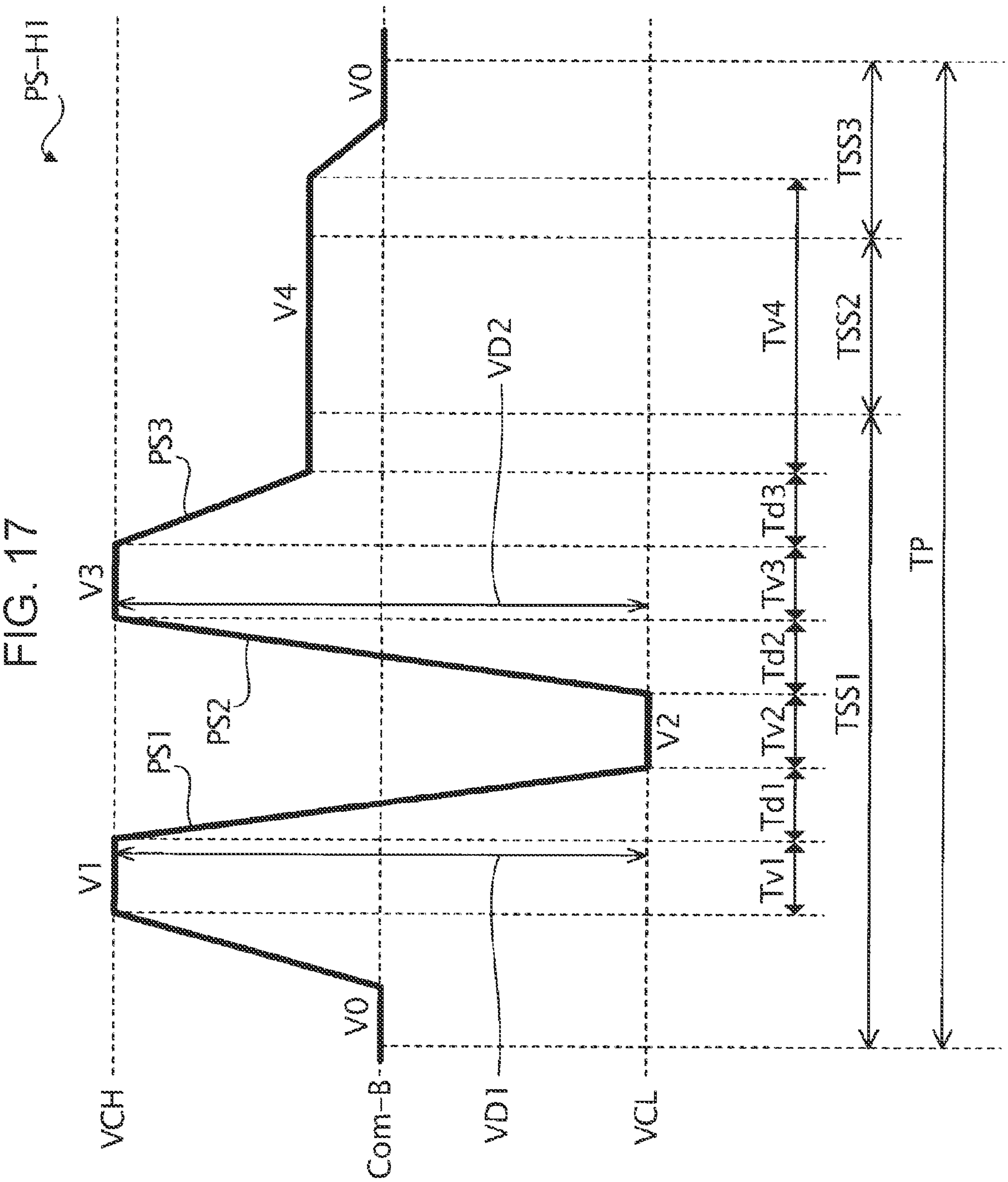
FIG. 17 is a timing chart of an example of a driving signal Com-B according to a first modification.

FIG. 17 is a timing chart of a driving signal Com-B according to the first modification.

As illustrated in FIG. 17, the driving signal Com-B according to the first modification includes a waveform PS-H1 in the unit period TP.

Here, the waveform PS-H1 changes from a reference potential V0 to a potential V4 higher than the reference potential V0 through a potential V1 higher than the reference potential V0, a potential V2 lower than the reference potential V0, and a potential V3 higher than the reference potential V0 in a control period TSS1, maintains the potential V4 in a control period TSS2, and changes from the potential V4 to the reference potential V0 in a control period TSS3.

Note that it is assumed, in this modification, that the potential V1 is substantially the same as the potential VCH, the potential V2 is substantially the same as the potential VCL, and the potential V3 is substantially the same as the potential VCH. Furthermore, it is assumed, in this modification, that the potential V4 is between the reference potential V0 and the potential VCH. However, the present disclosure is not limited to this form. The potential V4 may be between the potentials VLA1 and VHA1, for example. Note that the potential V4 is an example of a "specific potential" in this modification.

Furthermore, in this modification, a portion of the waveform PS-H1 that changes its potential from the potential V3 to the potential V4 is referred to as a partial waveform PS3. Furthermore, in this modification, a portion of the driving signal Com-B that corresponds to the partial waveform PS3 is referred to as a partial signal Com-PS3. Specifically, in this modification, the driving signal Com-B includes the partial signal Com-PS1 having the partial waveform PS1, the partial signal Com-PS2 having the partial waveform PS2, and the partial signal Com-PS3 having the partial waveform PS3. Here, the partial signal Com-PS3 is an example of a "third partial signal".

Note that, according to the first modification, a potential of the driving signal Com-B is maintained at the potential V1 in a period Tv1 of the control period TSS1, the partial waveform PS1 in which the potential of the driving signal Com-B changes from the potential V1 to the potential V2 is included in a period Td1 of the control period TSS1, the potential of the driving signal Com-B is maintained at the potential V2 in a period Tv2 of the control period TSS1, the partial waveform PS2 in which the potential of the driving signal Com-B changes from the potential V2 to the potential V3 is included in a period Td2 of the control period TSS1, the potential of the driving signal Com-B is maintained at the potential V3 in a period Tv3 of the control period TSS1, and the partial waveform PS3 in which the potential of the driving signal Com-B changes from the potential V3 to the potential V4 in a period Td3 of the control period TSS1, and the potential of the driving signal Com-B is maintained at the potential V4 in a period Tv4 of a unit period TP.

In this modification, a sum of a time length of the period Td2 and a time length of the period Tv3 is adjusted so that the sum is approximately the same as a time length of a times a cycle TC of vibration generated in an ejecting section D[m]. In other words, in this modification, the time length from the start of partial waveform PS2 to the start of partial waveform PS3 is adjusted so that the time length is a times the cycle TC. Here, the value α is a natural number satisfying "α≥2". In this modification, the value α is set to "2". Note that the time length from the start of the partial waveform PS2 to the start of the partial waveform PS3 is an example of a "time limit".

In this modification, after the partial waveform PS2 starts, the partial waveform PS3 starts after the time limit of a time length that is twice the cycle TC has elapsed. Therefore, according to this modification, a phase difference between vibration that occurs in the ejecting section D[m] when an ink ejection state in the ejecting section D[m] is appropriate and vibration that occurs in the ejecting section D[m] when an ejection error occurs in the ejecting section D[m] is larger than that in a form in which a time limit shorter than twice the cycle TC is provided. Furthermore, according to this modification, a phase difference between the vibration that occurs in the ejecting section D[m] when the ink ejection state in the ejecting section D[m] is appropriate and the vibration that occurs in the ejecting section D[m] when an ejection error occurs in the ejecting section D[m] is larger than that in a form in which the partial waveform PS3 is not provided. Therefore, according to this modification, an ejection state of the ejecting section D[m] may be determined based not only on a cycle TC of the vibration that occurs in the ejecting section D[m] driven as the determination target ejecting section DH, but also on a phase of the vibration that occurs in the ejecting section D[m] driven as the determination target ejecting section DH.

Note that, in this modification, in the driving signal Com-B having the waveform PS-H1, after the start of the partial waveform PS2, the partial waveform PS3 starts after the elapse of the time limit of the time length that is α times the cycle TC, but the present disclosure is not limited to such a form. For example, in the driving signal Com-B having the waveform PS, the control period TSS2 may start after the start of the partial waveform PS2 and after the time limit of the time length that is a times the cycle TC.

As described above, in the ink jet printer 1 according to this modification, the driving signal Com-B includes the partial signal Com-PS3 which changes its potential from the potential VCH to the potential V4, and the determination unit 8, after the partial signal Com-PS1 and the partial signal Com-PS2 are supplied to the piezoelectric element PZ[m], determines whether a foreign matter GT has been attached to the inner wall NH of the nozzle opening N based on the vibration generated in the piezoelectric element PZ[m] due to supply of the partial signal Com-PS3 to the piezoelectric element PZ[m].

Furthermore, according to the ink jet printer 1 of this modification, the driving signal Com-A may drive the piezoelectric element PZ[m] by changing a potential in the range from the potential VLA1 to the potential VHA1 so that ink is ejected from the nozzle opening N, the driving signal Com-B may include the partial signal Com-PS3 that changes its potential from the potential VCH to the potential V4, the determination unit 8 may determine whether a foreign matter GT has been attached to the inner wall NH of the nozzle opening N based on the vibration generated in the piezoelectric element PZ[m] when the partial signal Com-PS3 is supplied to the piezoelectric element PZ[m] after the partial signals Com-PS1 and Com-PS2 are supplied to the piezoelectric element PZ[m], the potentials VCH and VCL may not be included in the range from the potential VLA1 to the potential VHA1, and the potential V4 may be included in the range from the potential VLA1 to the potential VHA1.

In the ink jet printer 1 according to this modification, the supply circuit 31 may start the supply of the partial signal Com-PS3 to the piezoelectric element PZ[m] after the time limit of the time length that is twice the cycle TC of the vibration generated in the piezoelectric element PZ[m] has elapsed from the start of the supply of the partial signal Com-PS2 to the piezoelectric element PZ[m].

Therefore, according to this modification, an ejection error caused by a foreign matter GT adhering to the inner wall NH of the nozzle opening N may be accurately detected based on a phase of vibration generated in the piezoelectric element PZ[m].

Second Modification

Although the potential V1 is substantially the same as the potential VCH, the potential V2 is substantially the same as the potential VCL, and the potential V3 is substantially the same as the potential VCH in the driving signal Com-B, for example, according to the foregoing embodiment and the first modification, the present disclosure is not limited to such a form. For example, in the driving signal Com-B, the potential V1 may be substantially the same as the potential VCL, the potential V2 may be substantially the same as the potential VCH, and the potential V3 may be substantially the same as the potential VCL.

Figure 18:
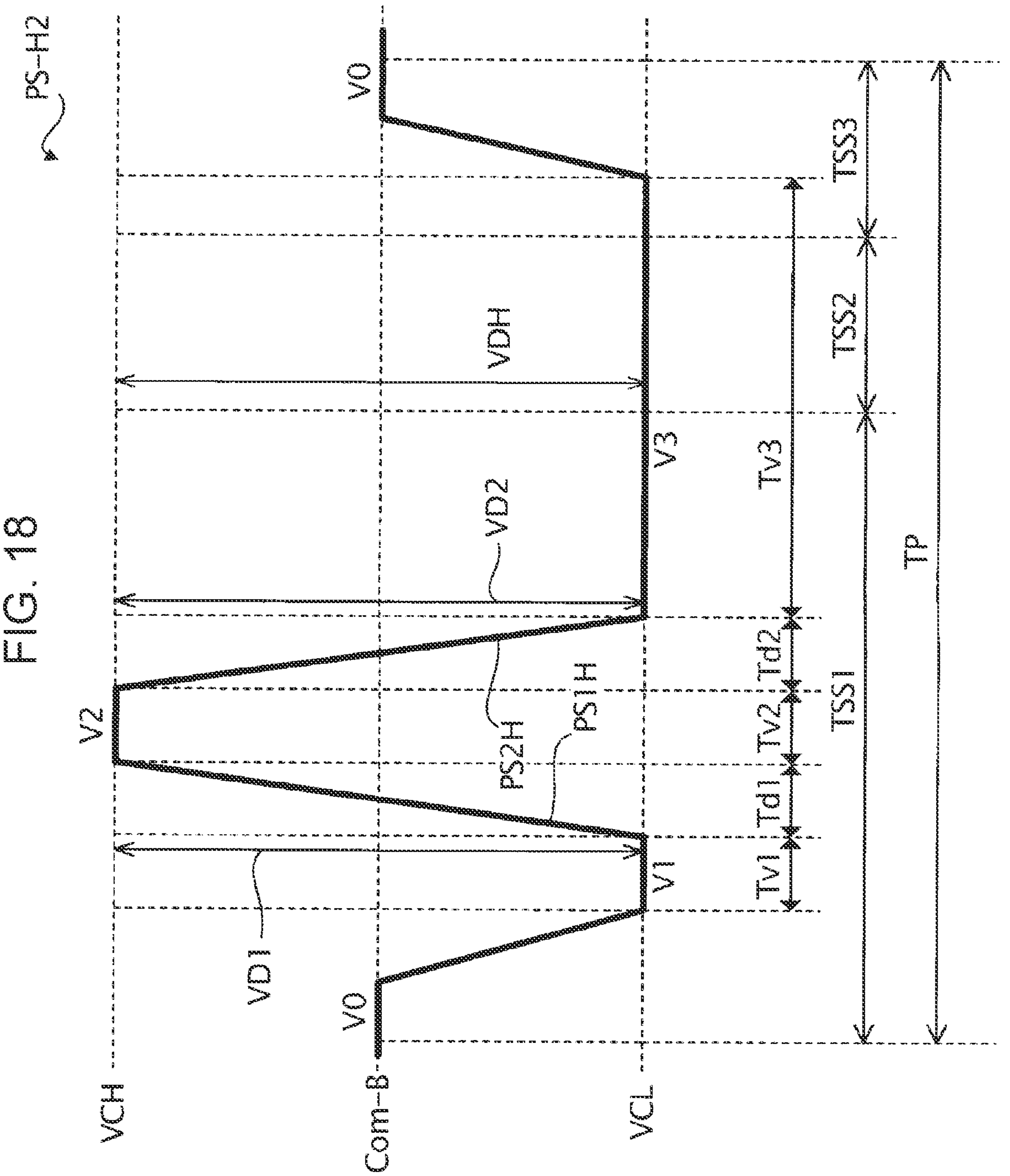
FIG. 18 is a timing chart of an example of a driving signal Com-B according to a second modification.

FIG. 18 is a timing chart of a driving signal Com-B according to a second modification.

As illustrated in FIG. 18, the driving signal Com-B according to the second modification includes a waveform PS-H2 in a unit period TP.

Here, the waveform PS-H2 changes from a reference potential V0 to a potential V3 lower than the reference potential V0 through a potential V1 lower than the reference potential V0 and a potential V2 higher than the reference potential V0 in a control period TSS1, maintains the potential V3 in a control period TSS2, and changes from the potential V3 to the reference potential V0 in a control period TSS3. Note that, in this modification, it is assumed that the potential V1 is a potential VCL, the potential V2 is a potential VCH, and the potential V3 is a potential VCL.

Specifically, according to the second modification, a potential of the driving signal Com-B is maintained at the potential VCL in a period Tv1 of the control period TSS1, a partial waveform PS1H in which the potential of the driving signal Com-B changes from the potential VCL to the potential VCH is included in a period Td1 of the control period TSS1, the potential of the driving signal Com-B is maintained at the potential VCH in a period Tv2 of the control period TSS1, a partial waveform PS2H in which the potential of the driving signal Com-B changes from the potential VCH to the potential VCL is included in a period Td2 of the control period TSS1, the potential of the driving signal Com-B is maintained at the potential VCL in a period Tv3 of a unit period TP, and the potential of the driving signal Com-B changes from the potential VCL to the reference potential V0 after the period Tv3 of the unit period TP.

According to this modification, a potential in the partial waveform PS1H included in the driving signal Com-B may be considerably changed, and in addition, a potential in the partial waveform PS2H included in the driving signal Com-B may be considerably changed. Therefore, according to this modification, the driving signal Com-B may significantly drive the piezoelectric element PZ[m]. Therefore, according to this modification, an ejection error caused by a foreign matter GT adhering to the inner wall NH of the nozzle opening N may be accurately detected.

Third Modification

Although the determination unit 8 is provided separately from the head unit 3, for example, according to the foregoing embodiment and the first and second modifications, the present disclosure is not limited to such a form.

Figure 19:
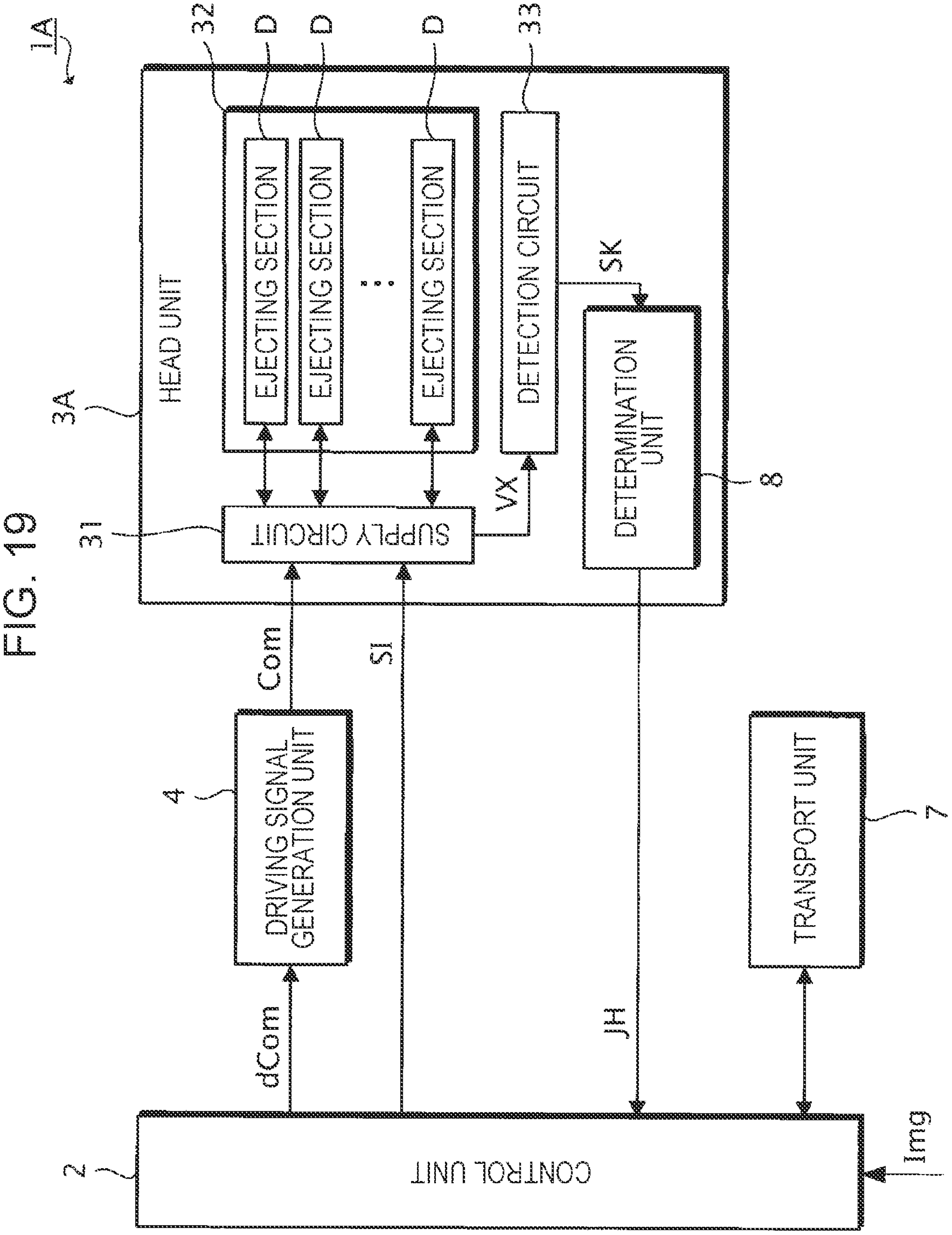
FIG. 19 is a block diagram illustrating an example of a configuration of an ink jet printer according to a third modification.

FIG. 19 is a block diagram illustrating an example of a configuration of an ink jet printer 1A according to a third modification.

As illustrated in FIG. 19, the ink jet printer 1A is different from the ink jet printer 1 of the foregoing embodiment in that the ink jet printer 1A has a head unit 3A instead of the head unit 3. Furthermore, the head unit 3A is different from the head unit 3 of the foregoing embodiment in that the head unit 3A includes a determination unit 8.

According to this modification, since the determination unit 8 is included in the head unit 3A, the possibility of noise being mixed into a detection signal SK[m] to be supplied from a detection circuit 33 to the determination unit 8 may be suppressed when compared with a form in which the determination unit 8 is provided outside the head unit 3A, and accordingly, accuracy of a determination made by the determination unit 8 may be improved.

Fourth Modification

Although it is assumed that the ink jet printer 1 includes the four head units 3 in the foregoing embodiment and the first to third modifications, the present disclosure is not limited to such a form. The ink jet printer 1 may include at least one and at most three head units 3, or the ink jet printer 1 may include five or more head units 3.

Fifth Modification

Although the ink jet printer 1 is a serial printer, for example, according to the foregoing embodiment and the first to fourth modifications, the present disclosure is not limited to such a form. The ink jet printer 1 may be a so-called line printer having a plurality of nozzle openings N in a head unit 3 such that the nozzle openings N extend wider than a width of a recording sheet PP.

What is claimed is:

1. A liquid ejecting apparatus, comprising:

a supply section configured to selectively supply
- a first driving signal that drives a piezoelectric element to form an image on a medium by ejecting liquid from a nozzle opening, and
- a second driving signal that drives the piezoelectric element to determine whether a foreign matter adheres to an inner wall of the nozzle opening; and a determination section that determines whether a foreign matter adheres to the inner wall, wherein the second driving signal includes
- a partial signal having a potential changing from a reference potential to a first potential,
- a first partial signal having a potential changed from the first potential to a second potential,
- a second partial signal having a potential changed from the second potential to the first potential, and
- a third partial signal having a potential changed from the first potential to a specific potential, and the determination section determines,
- after the partial signal, the first partial signal, and the second partial signal are supplied to the piezoelectric element,
- based on vibration generated in the piezoelectric element due to supply of the third partial signal to the piezoelectric element,
- whether a foreign matter adheres to the inner wall.

2. The liquid ejecting apparatus according to claim 1, wherein the first driving signal changes a potential in a range from a third potential to a fourth potential to drive the piezoelectric element and cause the nozzle opening to eject liquid, and the first potential and the second potential are not included in a range from the third potential to the fourth potential.

3. The liquid ejecting apparatus according to claim 1, wherein the first potential is, among potentials to be generated by a generation section that generates the first and second driving signals, one of a highest potential and a lowest potential to be supplied to the piezoelectric element through the supply section, and the second potential is, among the potentials to be generated by the generation section, the other of the highest potential and the lowest potential to be supplied to the piezoelectric element through the supply section.

4. The liquid ejecting apparatus according to claim 1, wherein the first driving signal changes a potential in a range from a third potential to a fourth potential to drive the piezoelectric element and cause the nozzle opening to eject liquid, and the first potential and the second potential are not included in a range from the third potential to the fourth potential, and the specific potential is included in the range from the third potential to the fourth potential.

5. The liquid ejecting apparatus according to claim 1, wherein the supply section starts, after a time limit of a time length that is twice a cycle of vibration generated in the piezoelectric element elapses from start of supply of the second partial signal to the piezoelectric element, supply of the third partial signal to the piezoelectric element.

6. The liquid ejecting apparatus according to claim 1, wherein an amount of displacement of a liquid surface at the nozzle opening obtained when the piezoelectric element is driven by supply of the second driving signal is larger than an amount of displacement of a liquid surface at the nozzle opening obtained when the piezoelectric element is driven by supply of the first driving signal.

7. The liquid ejecting apparatus according to claim 1, wherein a potential difference in the first partial signal is equal to a potential difference in the second partial signal.

8. A head unit comprising:

a supply section configured to selectively supply a first driving signal that drives a piezoelectric element to form an image on a medium by ejecting liquid from a nozzle opening, and a second driving signal that drives the piezoelectric element to determine whether a foreign matter adheres to an inner wall of the nozzle opening; and a determination section that determines whether a foreign matter adheres to the inner wall, wherein the second driving signal includes a partial signal having a potential changing from a reference potential to a first potential, a first partial signal having a potential changed from a first potential to a second potential, a second partial signal having a potential changed from the second potential to the first potential, and a third partial signal having a potential changed from the first potential to a specific potential, and the determination section determines, after the partial signal, the first partial signal, and the second partial signal are supplied to the piezoelectric element, based on vibration generated in the piezoelectric element due to supply of the third partial signal to the piezoelectric element, whether a foreign matter adheres to the inner wall.

9. The head unit according to claim 8, wherein the first driving signal changes a potential in a range from a third potential to a fourth potential to drive the piezoelectric element and cause the nozzle opening to eject liquid, and the first potential and the second potential are not included in a range from the third potential to the fourth potential.

10. The head unit according to claim 8, wherein the first potential is, among potentials to be generated by a generation section that generates the first and second driving signals, one of a highest potential and a lowest potential to be supplied to the piezoelectric element through the supply section, and the second potential is, among the potentials to be generated by the generation section, the other of the highest potential and the lowest potential to be supplied to the piezoelectric element through the supply section.

11. The head unit according to claim 8, wherein the first driving signal changes a potential in a range from a third potential to a fourth potential to drive the piezoelectric element and cause the nozzle opening to eject liquid, and the first potential and the second potential are not included in a range from the third potential to the fourth potential, and the specific potential is included in the range from the third potential to the fourth potential.

12. The head unit according to claim 8, wherein the supply section starts, after a time limit of a time length that is twice a cycle of vibration generated in the piezoelectric element elapses from start of supply of the second partial signal to the piezoelectric element, supply of the third partial signal to the piezoelectric element.

13. The head unit according to claim 8, wherein an amount of displacement of a liquid surface at the nozzle opening obtained when the piezoelectric element is driven by supply of the second driving signal is larger than an amount of displacement of a liquid surface at the nozzle opening obtained when the piezoelectric element is driven by supply of the first driving signal.

* * * * *